US009020316B2

(12) United States Patent
Bookbinder et al.

(10) Patent No.: US 9,020,316 B2
(45) Date of Patent: Apr. 28, 2015

(54) LOW ATTENUATION OPTICAL FIBERS WITH AN F-GRADED INDEX CORE

(71) Applicant: Corning Incorporated, Corning, NY (US)

(72) Inventors: Dana Craig Bookbinder, Corning, NY (US); Rostislav Radiyevich Khrapko, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 72 days.

(21) Appl. No.: 13/803,578

(22) Filed: Mar. 14, 2013

(65) Prior Publication Data
US 2014/0241684 A1 Aug. 28, 2014

Related U.S. Application Data

(60) Provisional application No. 61/770,565, filed on Feb. 28, 2013.

(51) Int. Cl.
*G02B 6/028* (2006.01)
*G02B 6/02* (2006.01)

(52) U.S. Cl.
CPC ............ *G02B 6/0281* (2013.01); *G02B 6/0288* (2013.01); *G02B 6/02014* (2013.01); *G02B 6/02019* (2013.01)

(58) Field of Classification Search
USPC ........................................... 385/124
See application file for complete search history.

(56) References Cited

U.S. PATENT DOCUMENTS

| 5,053,068 | A | 10/1991 | Kyoto et al. |
| 5,090,979 | A | 2/1992 | Le Sergent et al. |
| 5,145,507 | A | 9/1992 | Kyoto |
| 5,203,899 | A | 4/1993 | Kyoto |
| 5,221,309 | A | 6/1993 | Kyoto |
| 5,364,428 | A | 11/1994 | Kyoto |

(Continued)

FOREIGN PATENT DOCUMENTS

| EP | 1191367 A2 | 3/2002 |
| EP | 2054745 A2 | 2/2008 |

(Continued)

OTHER PUBLICATIONS

PCT/US2014/018514 Search Report.

(Continued)

*Primary Examiner* — Eric Wong
(74) *Attorney, Agent, or Firm* — Robert L Carlson

(57) ABSTRACT

An optical fiber is provided that includes a fiber configured to transmit optical data in a plurality of modes or in a single mode; a core region in the fiber that comprises fluorine-doped silica; and a cladding in the fiber that surrounds the core region and that comprises fluorine-doped silica. The core region has a graded refractive index profile with an alpha of about 0.5 to 5. The core of the fiber may be set with a radius of approximately 6 to 50 microns. The cladding may also comprise one or a plurality of layers, including trench or moat regions of a relatively lower refractive index. Still further, an inner cladding may be doped with fluorine at a concentration greater than that in the core region. An outer cladding can comprise silica with fluorine at a concentration below or equal to that in the inner cladding.

22 Claims, 10 Drawing Sheets

(56) References Cited

U.S. PATENT DOCUMENTS

| | | |
|---|---|---|
| 6,134,367 A | 10/2000 | Jones et al. |
| 6,658,190 B2 | 12/2003 | Hirano et al. |
| 6,917,470 B2 | 7/2005 | Iizuka |
| 7,088,900 B1 | 8/2006 | Mishra |
| 7,190,868 B2 | 3/2007 | Yamamoto |
| 7,426,327 B2 | 9/2008 | Mishra |
| 7,555,187 B2 | 6/2009 | Bickham et al. |
| 7,593,612 B2 | 9/2009 | Shimotakahara |
| 7,689,085 B1 | 3/2010 | Mishra |
| 7,844,155 B2 | 11/2010 | Bickham et al. |
| 7,929,818 B1 | 4/2011 | Bickham et al. |
| 2005/0013572 A1 | 1/2005 | Guan et al. |
| 2005/0062663 A1* | 3/2005 | Hills ............... 343/781 P |
| 2008/0050075 A1 | 2/2008 | Fleming et al. |
| 2008/0050086 A1 | 2/2008 | Bickham et al. |
| 2009/0169163 A1 | 7/2009 | Abbott, III et al. |
| 2010/0189399 A1 | 7/2010 | Sillard et al. |
| 2012/0189258 A1 | 7/2012 | Overton et al. |
| 2012/0230638 A1 | 9/2012 | Bickham et al. |
| 2013/0136408 A1* | 5/2013 | Bookbinder et al. ......... 385/124 |

FOREIGN PATENT DOCUMENTS

| | | |
|---|---|---|
| EP | 2418523 | 8/2011 |
| EP | 2420875 | 2/2012 |
| EP | 2518546 | 4/2012 |

OTHER PUBLICATIONS

Jeunhomme, "Single Mode Fiber Optics," p. 39-44, Marcel Dekker, New York 1990.

PCT/US14/018514 Invitation to Pay Additional Fees.

* cited by examiner

LOW ATTENUATION OPTICAL FIBERS WITH AN F-GRADED INDEX CORE

CROSS REFERENCE TO RELATED APPLICATIONS

This application claims the benefit of priority under 35 U.S.C. §119 of U.S. Provisional Application Ser. No. 61/770,565 filed on Feb. 28, 2013, the content of which is relied upon and incorporated herein by reference in its entirety.

BACKGROUND

The disclosure generally relates to low cost, low attenuation optical fibers for data transmission and, more particularly, relates to fiber designs with graded index core regions.

Low attenuation (e.g., a fiber having an attenuation value of ≤0.18 dB/km) is an important characteristic of optical fibers configured to efficiently transmit data.

Fiber nonlinearity is also a factor limiting the performance of optical fibers used in high speed, long haul transmission applications. In general, fiber nonlinearity can be reduced by increasing the effective area of the fiber. This is because power density is inversely proportional to the effective area. While some fiber designs configured for single mode operation have focused on increasing the effective area, the effective area achieved by these designs has been limited by micro- and macro-bending losses to an effective area of about 150 $\mu m^2$. With recent advances in digital signal processing (DSP), linear impairment to transmission systems (e.g., chromatic dispersion and polarization mode dispersion (PMD)), is not a significant problem. Yet even with the advancements in DSP, the modal dispersion levels still should be minimized.

Consequently, there is a need for low attenuation optical fiber designs, configured to operate in a single mode at 1550 nm.

SUMMARY

One aspect of the present disclosure relates to optical fibers that are configured to transmit optical data in a single mode at 1550 nm, and thus have a 22 meter cutoff wavelength less than 1530 nm, and may comprise a core region in the fiber that comprises fluorine-doped silica; and a cladding in the fiber that surrounds the core region that also comprises fluorine doped silica. The core region preferably has a graded refractive index profile with an alpha of about 0.5 to 5. The core may have an outer radius of between about 4 and 10 microns.

Another aspect of the present disclosure relates to an optical fiber including a fiber configured to transmit optical data in a plurality of modes; a core region in the fiber that comprises fluorine-doped silica; and a cladding in the fiber that surrounds the core region that comprises fluorine-doped silica. The core region has a graded refractive index profile with an alpha of about 0.5 to 5 and a radius of approximately 6 to 50 microns, more preferably between 10 and 50 microns.

In another aspect, the optical fiber may include a fiber configured to transmit optical data; and a core region in the fiber that comprises fluorine-doped silica. The optical fiber may include an inner cladding in the fiber that surrounds the core region and comprises silica doped with fluorine at a concentration greater than the concentration of the fluorine in the core region. The optical fiber also includes an outer cladding in the fiber that surrounds the inner cladding and comprises silica with fluorine at a concentration approximately equal to or less than the concentration of the fluorine in the inner cladding. The core region has a graded refractive index profile with an alpha of about 0.5 to 5. The outer cladding may comprise silica with fluorine at a concentration approximately equal to or less than the concentration of the fluorine in the core.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
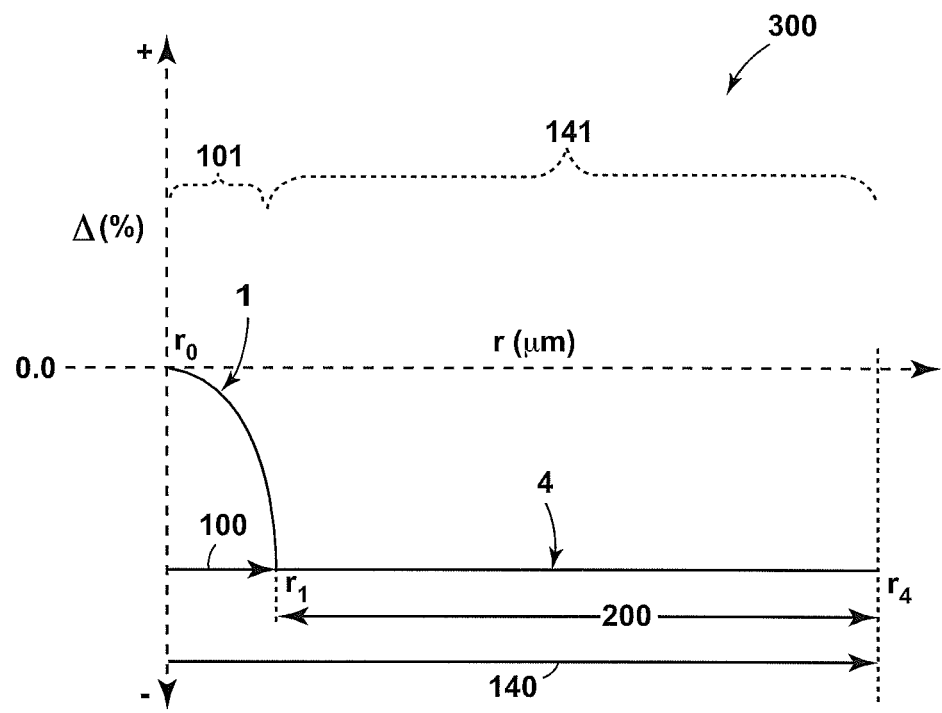
FIG. 1 is a schematic diagram that depicts refractive index as a function of fiber radius for an optical fiber with a core and a cladding.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and fiber radius.

The terms "$\mu m$" and "micron" are used interchangeably herein.

The "relative refractive index percent" is defined in Equation (1) below as:

$$\Delta\% = 100 \times (n_i^2 - n_c^2)/2n_i^2 \quad (1)$$

where $n_c$ is the average refractive index of undoped silica and $n_i$ is the average refractive index at point i in the particular region of the optical fiber.

As further used herein, the relative refractive index is represented by $\Delta$ and its values are given in units of "%", unless otherwise specified. The terms $\Delta$, % $\Delta$, $\Delta\%$, delta index, percent delta index and % can be used interchangeably herein. In cases where the refractive index of a region is less than the average refractive index of undoped silica, the relative index percent is negative and is referred to as having a depressed region or depressed index. In cases where the refractive index is greater than the average refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Examples of down-dopants include F and B.

"Chromatic dispersion", herein referred to as "dispersion" unless otherwise noted, of an optical fiber is the sum of the material dispersion and the waveguide dispersion. Zero dispersion wavelength is a wavelength at which the dispersion has a value of zero. Dispersion slope is the rate of change of dispersion with respect to wavelength.

"Effective area" is defined in Equation (2) as follows:

$$Aeff = 2\pi \left[ \frac{\left(\int f^2 r dr\right)^2}{\int f^4 r dr} \right] \quad (2)$$

where the integration limits are 0 to ∞, f is the transverse component of the electric field associated with light propagated in the waveguide (i.e., optical fiber), and r is the radius of the fiber. As used herein, "effective area" or "$A_{eff}$" refers to optical effective area at a wavelength of 1550 nm (i.e., the fundamental mode) unless otherwise noted.

The term "alpha" or "α-profile" refers to a relative refractive index profile, expressed in terms of $\Delta(r)$. $\Delta(r)$ is in units of "%", where r is radius, and follows Equation (3) as follows:

$$\Delta(r) = \Delta_{1max}\left[1 - \left(\frac{r}{r_1}\right)^\alpha\right] \quad (3)$$

where $\Delta_{1max}$ is the peak refractive index change in the center of the fiber (i.e., core delta), and $r_1$ is the core radius. Alpha as reported herein is measured at 1550 nm. An α=1 corresponds to a triangular profile, an α=2 describes a parabolic profile, and α>20 corresponds to profiles approaching a step index. Accordingly, α=∞ corresponds to a pure step-index profile.

The mode field diameter (MFD) is measured using the Peterman II method according to Equation (4) as follows:

$$MFD = 2w; \text{ and} \quad (4)$$

$$w^2 = 2\frac{\int f^2 r dr}{\int \left(\frac{df}{dr}\right)^2 r dr}$$

where w is the mode field radius, and the integral limits are 0 to ∞.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multi-mode fiber.

Cable cutoff measurement is performed using the standard 22 m test described in EA-455-170 Cable Cutoff Wavelength of Single-mode Fiber by Transmitted Power, or "FOTP-170".

Unless otherwise noted herein, optical properties (such as dispersion, dispersion slope, etc.) are reported for the $LP_{01}$ mode.

"Kappa" is the ratio of the chromatic dispersion to the dispersion slope.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 N. A 70 N force is then applied to the plates and the increase in attenuation in dB/m is measured. The increase in attenuation is the lateral load wire mesh (LLWM) attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation is again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm during testing, and sufficient tension is applied to make the waveguide fiber conform to a portion of the pin surface.

The "effective group refractive index," also known as the "group index" ($n_{geff}$), is the ratio of the velocity of light, c, to the group velocity, $v_g$, as given below by Equation (5):

$$n_{geff} = \frac{c}{v_g} \quad (5)$$

The mathematical expression for $v_g$ of a guided mode in the fiber in terms of electromagnetic field, refractive index, wavelength and propagation constant, derives from Maxwell's equations, or, more particularly, from the scalar wave equation. The group velocity $v_g$ is defined below in Equation (6):

$$v_g = \frac{\partial \omega}{\partial \beta} \quad (6)$$

where ω is the wave's angular frequency, and β is the propagation constant of a guided mode. The propagation constant β, also called the effective refractive index, is an electromagnetic field parameter related to field propagation velocity and is found by solving the scalar wave equation for a selected waveguide. Because β depends upon waveguide geometry, one may expect that bending the waveguide will change β. See, e.g., U.S. Pat. No. 6,134,367 at 3:14-29, hereby incorporated by reference.

The optical fiber designs outlined in this disclosure can be optimized for low attenuation performance in both single and few mode configurations by limiting the $GeO_2$ content in the fiber. Further, a germania-limited core in the optical fiber can improve the attenuation performance of the optical fiber and to reduce the effects of Rayleigh scattering. By $GeO_2$-limited $SiO_2$ core as used herein, we mean that the fibers contain less than 1 wt % of $GeO_2$ or $TiO_2$, alone or in combination. More preferably, the fibers disclosed herein contain less than 0.5 wt %, and even more preferably less than 0.1 wt % of $GeO_2$ or $TiO_2$, alone or in combination. In some embodiments, the core consists essentially of fluorine doped silica. The core of the fibers disclosed herein may additionally include one or more of chlorine, potassium oxide and phosphorous pentoxide. Such fibers which have low amounts of $GeO_2$ and $TiO_2$ exhibit lower attenuation due to less Rayleigh Scattering. When doped with chlorine, and the concentration of chlorine may in some embodiments be highest at the center of the core region and vary inversely to the concentration of the fluorine as a function of the radius of the core region. It is preferred that fibers have an outer diameter of 80-150 microns, more preferred 120-130 microns, most preferred about 125 microns.

More improvements in attenuation can be realized by optimizing the dopant profile in a $GeO_2$-limited $SiO_2$ core. A graded index profile can be used in the core instead of a step index core to significantly improve attenuation performance. In particular, the profile can exhibit an alpha value of about 0.5 to 5, with fluorine doped in a $GeO_2$-limited core to provide the graded index. Optionally, Cl, $K_2O$ and/or $P_2O_5$ dopants may be introduced in the graded core for added optical performance benefits. The graded index reduces viscosity mismatch in the core and between the core and cladding. Similarly, the graded index profile also reduces coefficient of thermal expansion-related (CTE) mismatch within the core and between the core and cladding. Together, these effects reduce internal stresses in the core, leading to better attenuation characteristics.

The low alpha profile in the core (i.e., the graded index profile) can be achieved using various methods. One approach relies on a non-uniform consolidation technique for doping with fluorine in a graded index. The non-uniform consolidation technique relies on outside vapor deposition (OVD) and vapor-phase axial deposition (VAD) methods. A second approach relies on a modified chemical vapor deposition (MCVD) approach. A third approach relies on a plasma-assisted chemical vapor deposition (PCVD) approach. In MCVD and PCVD approaches, the optical fiber core is made by layer-by-layer glass deposition, and the processes used to dope each layer can be independently controlled.

In those embodiments with both F and Cl doping in the core, it can be advantageous for each dopant to be introduced into the core in a non-uniform, graded index profile. In particular, the Cl concentration can be highest in the center of the core, lower at the outer radius of the core, with a doping profile approximately inverse to that the graded profile achieved by the F dopant. Thus, the concentration of F dopant at the center of the core may be relatively low, but increasing toward the outer radius of the core to form a graded index profile. These inverse, graded profiles can be created during the sinter phase of the core in a downdrive furnace or with MCVD or PCVD processing techniques. $Cl_2$ or $SiCl_4$ can be used as the source precursor for the Cl doping.

The composition of the cladding can also be important in achieving the desired low attenuation properties, and may be doped with F to lower the refractive index to be lower than the refractive index of the core. The cladding may optionally be further doped with one or more of boron trioxide and chlorine.

A step index between the core and cladding is acceptable. Optionally, Cl and/or $B_2O_3$ can be employed as dopants in the cladding alone, or as additions to F dopant already present in the cladding.

In some embodiments of the optical fiber designs in this disclosure, the core and cladding can be configured to minimize or eliminate the presence of alkali elements (e.g., potassium). Alkali doping is a comparatively more expensive than processes used for other dopants (e.g., fluorine doping). Accordingly, the low attenuation, alkali-free optical fiber designs disclosed herein are particularly optimized to reduce processing and manufacturing costs.

Figure 1A:
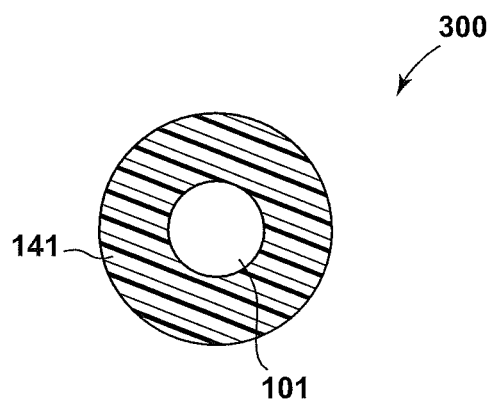
FIG. 1A is a cross-sectional view of the optical fiber depicted in FIG. 1.
Figure 2:
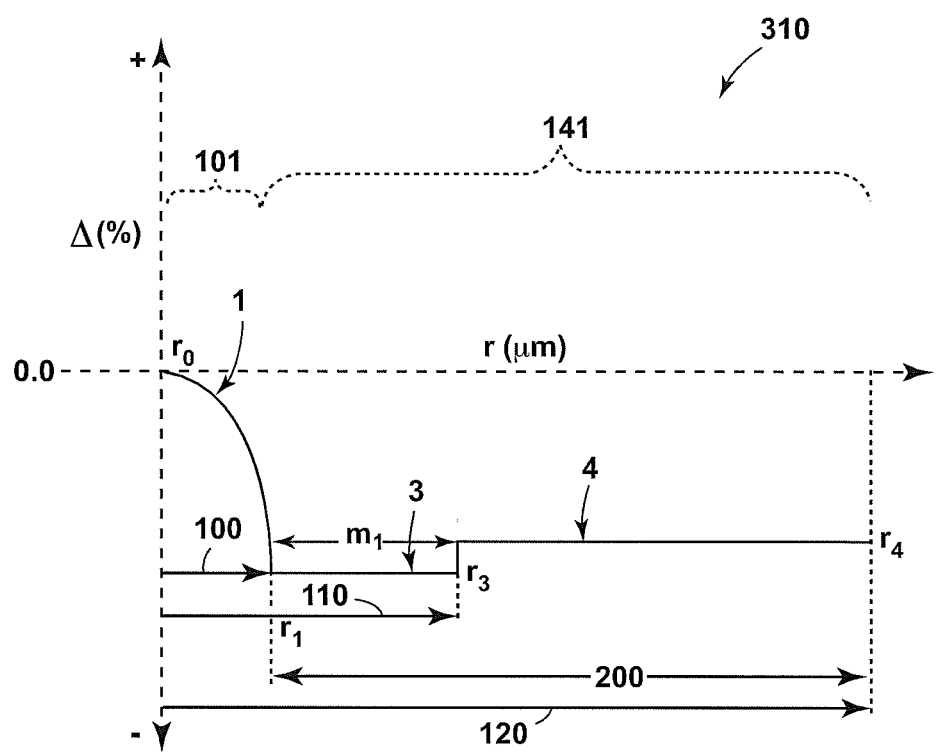
FIG. 2 is schematic diagram that depicts refractive index as a function of fiber radius for an optical fiber with a core, a first cladding layer and a second cladding layer.
Figure 3:
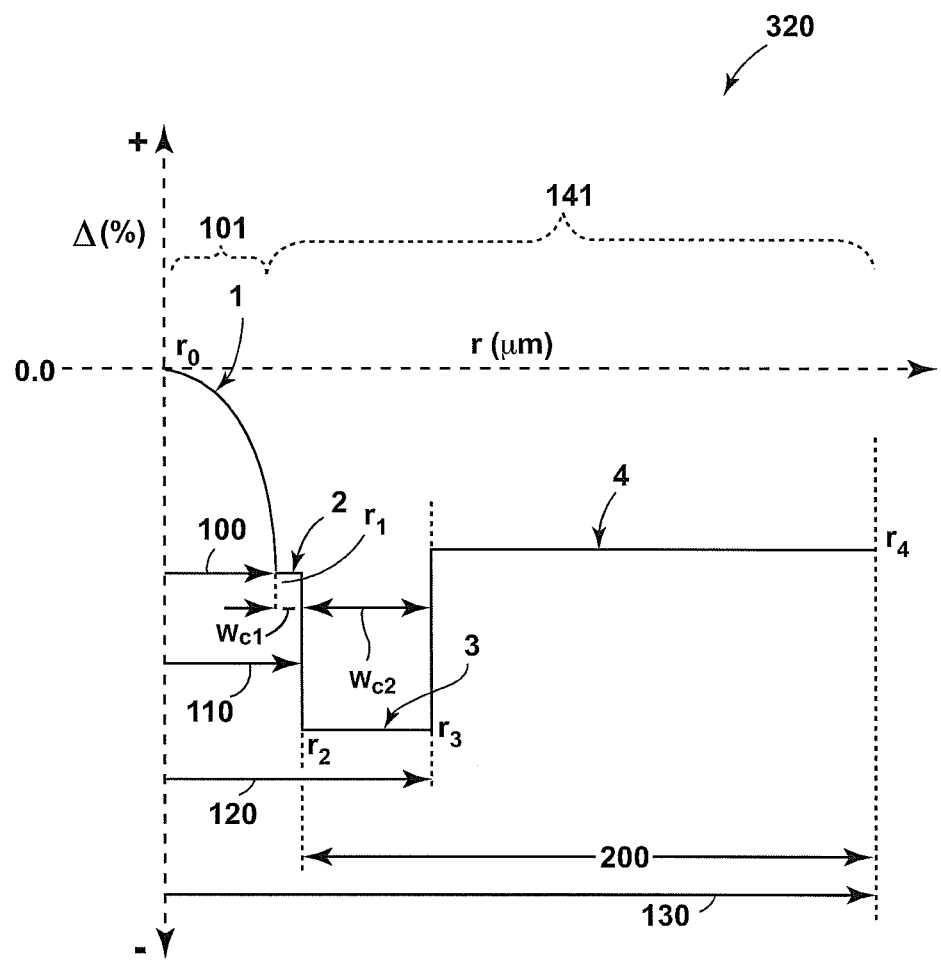
FIG. 3 is schematic diagram that depicts refractive index as a function of fiber radius for an optical fiber with a core, a first cladding layer, a second cladding layer, and a third cladding layer.

FIGS. 1-3 depict the relative refractive index profile as a function of fiber radius for three optical fiber designs 300, 310 and 320, respectively, according to aspects of this disclosure. These relative refractive index profiles of fibers 300, 310 and 320 are plotted using pure undoped $SiO_2$ as a baseline relative refractive index equal to zero. Each of these optical fiber designs 300, 310, and 320 may be configured for single mode and few mode (i.e., plurality of modes) operational schemes at 1550 nm according to aspects of this disclosure. Cross-sections of fiber 300 is also shown in FIG. 1A, for further illustration of the salient features of these fibers.

As shown in FIGS. 1-3, each fiber 300, 310, and 320 possesses a core 101 with a radius 100 ($r_1$). The core 101 can have an alpha profile of about 0.5 to 5, forming a graded, relative refractive index profile 1. Preferably, core 101 exhibits an alpha profile from about 0.5 to 5, more preferably 1 to 3. The relative refractive index 1 ($\Delta_1$) of the core 101 varies as a function of fiber radius (r). The core 101 has a core radius 100 ($r_1$). The core 101, from its center to its radius 100 ($r_1$), primarily contains $SiO_2$ doped with F. Optionally, the core 101 may be doped with Cl, $K_2O$, and/or $P_2O_5$. These dopants may be introduced into the $SiO_2$ core 101 by OVD, VAD, MCVD, and PCVD processing methods.

Fibers 300, 310 and 320 have a single cladding 141 (FIGS. 1 and 1A), a cladding with two cladding layers (FIG. 2) or a cladding with three cladding layers (FIG. 3. All of the cladding layers may primarily contain $SiO_2$ doped with F. Optionally, Cl and/or $B_2O_3$ can be employed as dopants in the various cladding layers in addition to the F dopant.

Referring to FIGS. 1 and 1A, optical fiber 300 possesses a cladding 141 with a thickness 200 and outer radius 140 ($r_2$). The relative refractive index 4 ($\Delta_4$) of the cladding 141 is preferably substantially constant out to the outer radius 140

($r_4$). The relative refractive index 4 of the cladding 141 may be a step-shaped profile and comprises 42 min.

Referring to FIG. 2, optical fiber 310 possesses a cladding 141 having two cladding layers, depressed cladding layer 3 and outer cladding layer 4, both of which surround the core region 1. Depressed cladding layer 3 has a lower refractive index delta than outer cladding layer 4. Together, cladding layers 3 and 4 possess a total thickness 200. The relative refractive index profiles 3 and 4 in cladding layer 141 each may possess a step-shaped profile.

As shown in FIG. 2, the relative refractive index profile of the depressed cladding layer 3 in fiber 310 may have a value approximately equal to $\Delta_{3min}$ In FIG. 2, the depressed cladding layer 3 has a moat of width $m_1$ such that its relative refractive index 3 ($\Delta_3$) has a value lower than the relative refractive index of the core region 1 and the relative refractive index ($\Delta_4$) of outer cladding layer 4. As depicted in FIG. 2, the depressed cladding layer 3 has an outer radius 110 ($r_3$). F, Cl and/or $B_2O_3$, or combinations thereof, may be included as a refractive index lowering dopants to the depressed cladding layer 3 to facilitate the creation of the moat of width $m_1$ with respect to outer cladding layer 4. The relative refractive index 4 ($\Delta_4$) of the outer cladding is preferably substantially consistent to the outer radius ($r_4$) 120.

Referring to FIG. 3, optical fiber 320 possesses a cladding 141 having three cladding layers, inner cladding layer 2, depressed cladding layer 3, and outer cladding layer 4 surrounding the core region 1. Together, cladding layers 2, 3 and 4 possess a total thickness 200. Inner cladding region 2 comprises outer radius $r_2$. Depressed cladding region 3 comprises inner radius $r_2$ and outer radius $r_3$.

Depressed cladding layer 3 comprises relative refractive index $\Delta_{3min}$, and comprises outer radius $r_3$ Outer cladding layer 4 comprises relative refractive index $\Delta_4$, can be substantially constant, and outer radius $r_4$ (130) which corresponds to where the cladding layer 4 ends.

The relative refractive index profiles in cladding layers 2, 3, and 4 respectively, each may possess a step-shaped profile. As shown in FIG. 3, the relative refractive index profile of the inner cladding layer 2 may comprise a relatively constant refractive index, while depressed cladding layer 3 may comprise a trench of width $w_{e2}$ having relative refractive index $\Delta_3$ which is lower than the relative refractive index $\Delta_1$ of the core region 1, lower than $\Delta_2$ of inner cladding layer 2, and lower than the relative refractive index $\Delta_4$ of outer cladding layer 4 The depressed cladding region 3 may be offset from the core region 1 by a distance $w_{c1}$, which corresponds to the width of inner cladding region 2. F, Cl and/or $B_2O_3$, and combinations thereof may be added as refractive index lowering dopants to the any of the cladding layers 2, 3, and 4 to facilitate the creation of these cladding regions.

When configured for single mode operation, optical fibers 300, 310 and 320 (see FIGS. 1-3A) can have an alpha of about 0.5 to 5. The alpha value may also be set within a range of about 1 to 3. Further, the core 101 of fibers 300, 310 and 320 may have a peak relative refractive index $\Delta_{1max}$ of -0.2% to +0.1%. The peak relative refractive index $\Delta_{1max}$ may also range from -0.05% to +0.05%. In addition, the core 101 of fibers 300, 310, and 320, when configured for single mode operation, can have a core radius 100 ($r_1$) of about 4 to 12 microns. The effective area of core 101 can range from approximately 60 $\mu m^2$ to 100 $\mu m^2$.

The advantages of optical fibers 300, 310 and 320 configured for single mode operation include the relatively low cost of fluorine dopants compared to other dopant options, including germania. Yet these optical fiber designs possess characteristically low attenuation, <0.18 dB/km at a wavelength 1550 nm. Fibers 300, 310, and 320 when configured for single mode operation at 1550 nm, are particularly suited for G.652 and G.654 optical fiber applications, and for example may exhibit a cable cutoff less than 1530 nm, more preferably less than 1500 nm, and even more preferably less than 1260 nm, and a zero dispersion wavelength between 1300 and 1324 nm. For G.654 applications the fibers may be configured to have dispersion at 1550 nm which is less than or equal to 22 ps/nm/km.

When configured for operation in a few mode propagation (i.e., capable of transmitting a plurality of modes at about 1400-1700, more preferably 1500-1625, most preferably 1530-1570 nm), optical fibers 300, 310 and 320 (see FIGS. 1-3) can have an alpha of about 0.5 to 5. "Few moded propagation" and "capable of transmitting few modes" as used herein is defined as transmitting greater than 2 and less than 8 modes at a particular wavelength. In some preferred embodiments, such fibers disclosed herein transmit between 2 and 6, more preferably between 2 and 4 modes. An alpha value range of about 1 to 3 is more preferred in some embodiments. Further benefits, particularly in reducing modal time delays, are possible if the alpha value is within the range of approximately 1.9 to 2.1.

In addition, the core 101 of few-moded fibers 300, 310 and 320 may have a peak relative refractive index $\Delta_{1max}$ of -0.2% to +0.1% when using pure $SiO_2$ as the baseline. The peak relative refractive index $\Delta_{1max}$ may also range from -0.05% to +0.05%. In addition, the core 101 (i.e., core region) of fibers 300, 310, and 320 when configured for few mode operation can have a core radius 100 ($r_1$) of about 5 to 50 microns. The effective area of core 101 can range from approximately 90 $\mu m^2$ to at least 525 $\mu m^2$.

The advantages of optical fibers 300, 310 and 320 configured for few mode operation include the relatively low cost of fluorine dopants compared to other dopant options, including germania. Yet these optical fiber designs possess low attenuation, <0.18 dB/km at a wavelength 1550 nm. Few mode-configured fibers 300, 310 and 320 are suited for G.652 and G.654 optical fiber applications. They are also well-suited suited for low attenuation applications requiring a large fiber effective area, and multi-mode operation, particularly those requiring high data rate transfer over long distances.

EXAMPLES

Various embodiments will be further clarified by the following examples. It will be apparent to those skilled in the art that various modifications and variations can be made without departing from the spirit or scope of the invention. All examples listed below have an outer radius of 62.5 microns, fiber diameter of 125 microns.

Tables 1-3 below list characteristics of modeled illustrative Examples 1-14 of fibers 300, 310 and 320, configured for single mode operation, having relative refractive index profiles as a function of fiber radius as depicted in FIGS. 1-3. In particular, Examples 1-6 in Table 1 correspond to versions of fiber 300, as depicted in FIGS. 1 and 1A. Examples 7-10 correspond to versions of fiber 310, as depicted in FIG. 2. Finally, Examples 11-14 correspond to versions of fiber 320, as depicted in FIG. 3.

As Table 1 makes clear, the modeling results for variants of optical fiber 300 (Examples 1 to 6) with core 101 and cladding 141 (see FIGS. 1 and 1A) which transmit only single mode at 1550 nm, (i.e., having a 22 meter cutoff of less than 1550 nm more preferred <1400 nm) and in some embodiments ≤1260 nm, and exhibit attenuation levels of <0.19 dB/km, and even <0.18 dB/km when operating at a wavelength of 1550 nm. These fibers exhibit a dispersion at 1310 nm and 1550 nm between about -0.6 to +1, and 16.5 to 18.1 ps/nm/km, respectively. These fibers exhibit a dispersion slope at 1310 nm and 1550 nm between about 0.08 to 0.09, and 0.057 to 0.061 ps/nm$^2$/km, respectively. These fibers exhibit a mode field diameter at 1310 nm and 1550 nm between about 8.6 to 10, and 9.8 to 11.5 microns, respectively. The core of these fibers is $SiO_2$, doped with F; the graded index profiles of these fibers 300 reflect alpha values ($\alpha$) from 1 to 5; and the core delta ($\Delta_{1max}$) ranges from +0.05% to -0.05%. The core radius 100 ($r_1$) ranges from 4.6 to 6.7 $\mu m$ and the effective area ($A_{eff}$) at 1550 nm ranges from approximately 73 to 98 $\mu m^2$ for these variants of fiber 300.

TABLE 1

| Parameter | Ex. 1 | Ex. 2 | Ex. 3 | Ex. 4 | Ex. 5 | Ex. 6 |
|---|---|---|---|---|---|---|
| Core delta, $\Delta_{1max}$ (%) | 0.00 | 0.00 | 0.00 | +0.05 | −0.05 | 0.00 |
| Core radius, $r_1$ (μm) | 6.3 | 5.67 | 5.3 | 5 | 4.6 | 6.7 |
| Core alpha, α | 1 | 2 | 3 | 5 | 5 | 2 |
| Cladding delta, $\Delta_4$ (%) | −0.49 | −0.40 | −0.37 | −0.30 | −0.45 | −0.35 |
| Theoretical fiber cutoff (nm) | 1275 | 1290 | 1287 | 1302 | 1280 | 1438 |
| Cable (22 m) cutoff, nm | 1075 | 1090 | 1087 | 1302 | 1280 | 1238 |
| MFD at 1310 nm (μm) | 9.20 | 9.20 | 9.22 | 9.25 | 8.61 | 10.08 |
| $A_{eff}$ at 1310 nm (μm$^2$) | 63.2 | 64.1 | 65.0 | 66.4 | 57.39 | 77.7 |
| Dispersion at 1310 nm (ps/nm/km) | −0.64 | 0.24 | 0.57 | 1.01 | 0.37 | 0.49 |
| Slope at 1310 nm (ps/nm$^2$/km) | 0.088 | 0.086 | 0.085 | 0.084 | 0.08 | 0.09 |
| Kappa at 1310 nm (nm) | −7.24 | 2.73 | 6.71 | 11.94 | 4.47 | 5.41 |
| Lateral load at 1310 nm (dB) | 0.02 | 0.00 | 0.00 | 0.00 | 0.00 | 0.00 |
| Pin array at 1310 nm (dB) | 0.45 | 0.01 | 0.02 | 0.01 | 0.01 | 0.01 |
| Attenuation at 1310 nm (dB/km) | 0.30 | 0.30 | 0.31 | 0.31 | 0.31 | 0.30 |
| MFD at 1550 nm (μm) | 10.70 | 10.57 | 10.55 | 10.54 | 9.84 | 11.46 |
| $A_{eff}$ at 1550 nm (μm$^2$) | 84.6 | 83.4 | 83.6 | 84.1 | 73.2 | 98.3 |
| Dispersion at 1550 nm (ps/nm/km) | 16.6 | 17.0 | 17.1 | 17.4 | 16.5 | 18.1 |
| Slope at 1550 nm (ps/nm$^2$/km) | 0.060 | 0.059 | 0.058 | 0.057 | 0.06 | 0.061 |
| Kappa at 1550 nm (nm) | 275 | 290 | 297 | 305 | 294 | 296 |
| Lateral load at 1550 nm (dB) | 1.02 | 0.77 | 0.76 | 0.71 | 0.30 | 1.35 |
| Pin array at 1550 nm (dB) | 17.8 | 13.5 | 13.8 | 12.4 | 6.0 | 12.1 |
| Attenuation at 1550 nm (dB/km) | 0.169 | 0.170 | 0.171 | 0.172 | 0.174 | 0.168 |

The modeling results for variants of optical fiber 310 (Examples 7-10) with core 1 and cladding layers 3 and 4, i.e. made in accordance with the fibers disclosed in FIGS. 2 and 2A, are listed below in Table 2. Also set forth is the width $m_1$ of depressed cladding region 3. These fibers 310 are single moded at 1550 nm, and have a cable cutoff <1500 nm, more preferably <1400 nm, and in some embodiments ≤1260 nm, and exhibit attenuation levels <0.19 dB/km and even <0.18 dB/km at 1550 nm. These fibers exhibit dispersion at 1310 nm and 1550 nm between about 0.6 to 2.3, and 18 to 20 ps/nm/km, respectively. These fibers exhibit a dispersion slope at 1310 nm and 1550 nm between about 0.088 to 0.092, and 0.060 to 0.062 ps/nm$^2$/km, respectively. These fibers exhibit a mode field diameter at 1310 nm and 1550 nm between about 9.2 to 9.7, and 10.1 to 10.7 microns, respectively. The core of these fibers is SiO$_2$, doped with F; the graded index profiles of these fibers 310 reflect core alpha values (α) from 2 to 4; and the core delta ($\Delta_{1max}$) is approximately 0.0% for each of them. The effective area ($\Delta_{eff}$) of these fibers 310 at 1550 nm ranges from approximately 78 to 90 μm$^2$.

TABLE 2

| Parameter | Ex. 7 | Ex. 8 | Ex. 9 | Ex. 10 |
|---|---|---|---|---|
| Core delta, $\Delta_{1max}$ (%) | 0.00 | 0.00 | 0.00 | 0.00 |
| Core radius, $r_1$ (μm) | 6.5 | 6.85 | 6.42 | 7 |
| Core alpha, α | 2 | 3 | 2 | 3 |
| Moat delta, $\Delta_2$ (%) | −0.42 | −0.40 | −0.45 | −0.38 |
| Moat radius, $r_1 + m_1$ (μm) | 19.0 | 20 | 19.3 | 20.0 |
| Outer cladding, $\Delta_4$ (%) | −0.37 | −0.35 | −0.38 | −0.32 |
| Theoretical fiber cutoff (nm) | 1336 | 1542 | 1196 | 1507 |
| Cable (22 m) cutoff, nm | 1136 | 1342 | 996 | 1307 |
| MFD at 1310 nm (μm) | 9.1 | 9.56 | 9.2 | 9.7 |
| $A_{eff}$ at 1310 nm (μm$^2$) | 63.3 | 72.4 | 64.9 | 74.9 |
| Dispersion at 1310 nm (ps/nm/km) | 0.63 | 2.14 | 1.80 | 2.26 |
| Slope at 1310 nm (ps/nm$^2$/km) | 0.091 | 0.092 | 0.088 | 0.092 |
| Kappa at 1310 nm (nm) | 6.9 | 23.4 | 20.4 | 24.7 |
| Lateral load at 1310 nm (dB) | 0.00 | 0.00 | 0.00 | 0.00 |
| Pin array at 1310 nm (dB) | 0.01 | 0.00 | 0.06 | 0.00 |
| Attenuation at 1310 nm | 0.30 | 0.30 | 0.30 | 0.30 |
| MFD at 1550 nm (μm) | 10.1 | 10.5 | 10.3 | 10.7 |
| $A_{eff}$ at 1550 nm (μm$^2$) | 78.4 | 86.3 | 80.8 | 89.1 |
| Dispersion at 1550 nm (ps/nm/km) | 18.3 | 20.0 | 19.0 | 20.2 |
| Slope at 1550 nm (ps/nm$^2$/km) | 0.061 | 0.062 | 0.060 | 0.062 |
| Kappa at 1550 nm (nm) | 299 | 322 | 317 | 324 |
| Lateral load at 1550 nm (dB) | 0.2 | 0.1 | 0.5 | 0.1 |
| Pin array at 1550 nm (dB) | 2.8 | .0.4 | 13.7 | 0.9 |
| Attenuation at 1550 nm (dB/km) | 0.170 | 0.169 | 0.170 | 0.169 |

The modeling results for variants of optical fiber 320 (Examples 11-14) having core region 1 and cladding layers 2, 3 and 4 (see FIG. 3) are listed below in Table 3. Also set forth is the width $w_{c2}$ of depressed region 3, and the width $w_{c1}$ of inner cladding region 2. As shown below, these fibers 320 are transmit a single mode at 1550 nm cable cutoff ≤1260 nm exhibit attenuation levels of <0.19 dB/km and even <0.18 dB/km, when operating at a wavelength of 1550 nm. These fibers exhibit a dispersion at 1310 nm and 1550 nm between about 0.0 to 1.5, and 17.5 to 20.5 ps/nm/km, respectively. These fibers exhibit a dispersion slope at 1310 nm and 1550 nm of approximately 0.09, and 0.063 to 0.067 ps/nm$^2$/km, respectively. These fibers exhibit a mode field diameter at 1310 nm and 1550 nm between about 9 to 9.8, and 10.4 to 10.9 microns, respectively. The core of these fibers is SiO$_2$, doped with F; the graded index profiles of these fibers 320 reflect alpha values (α) of 2; and the core delta ($\Delta_{1max}$) is approximately 0.0% for each of them. The effective area ($\Delta_{eff}$) of these fibers 320 at 1550 nm ranges from approximately 80 to 91 μm$^2$.

TABLE 3

| Parameter | Ex. 11 | Ex. 12 | Ex. 13 | Ex. 14 |
|---|---|---|---|---|
| Core delta, $\Delta_{1max}$ (%) | 0.00 | 0.00 | 0.00 | 0.00 |
| Core radius, $r_1$ (μm) | 6.5 | 5.2 | 5.4 | 6.5 |
| Core alpha, α | 2 | 2 | 2 | 2 |
| First cladding layer delta, $\Delta_2$ (%) | −0.35 | −0.38 | −0.35 | −0.38 |
| Trench delta, $\Delta_3$ (%) | −0.60 | −0.60 | −0.70 | −0.60 |
| Trench start radius, $r_1 + w_{c1}$ (μm) | 10 | 9.8 | 12 | 10 |
| Trench end radius, $r_2 + w_{c2}$ (μm) | 18.0 | 16 | 18 | 18 |
| Outer cladding, $\Delta_4$ (%) | −0.35 | −0.38 | −0.35 | −0.38 |
| Theoretical fiber cutoff (nm) | 1285 | 1104 | 994 | 1339 |
| Cable (22 m) cutoff, nm | 1135 | 954 | 844 | 1179 |
| MFD at 1310 nm (μm) | 9.8 | 9.13 | 9.08 | 9.6 |
| $A_{eff}$ at 1310 nm (μm$^2$) | 74.5 | 62.8 | 62.2 | 71.0 |
| Dispersion at 1310 nm (ps/nm/km) | 1.46 | −0.02 | −0.03 | 1.32 |
| Slope at 1310 nm (ps/nm$^2$/km) | 0.095 | 0.09 | 0.09 | 0.09 |

TABLE 3-continued

| Parameter | Ex. 11 | Ex. 12 | Ex. 13 | Ex. 14 |
|---|---|---|---|---|
| Kappa at 1310 nm (nm) | 15.5 | −0.24 | −0.34 | 14.0 |
| Lateral load at 1310 nm (dB) | 0.01 | 0.04 | 0.10 | 0.00 |
| Pin array at 1310 nm (dB) | 0.1 | 1.3 | 5.0 | 0.1 |
| Attenuation at 1310 nm (dB/km) | 0.30 | 0.30 | 0.30 | 0.30 |
| MFD at 1550 nm (μm) | 10.9 | 10.46 | 10.42 | 10.6 |
| $A_{\mathit{eff}}$ at 1550 nm (μm²) | 91 | 81.7 | 81.0 | 86.8 |
| Dispersion at 1550 nm (ps/nm/km) | 20.3 | 17.9 | 17.5 | 20.1 |
| Slope at 1550 nm (ps/nm²/km) | 0.067 | 0.064 | 0.063 | 0.067 |
| Kappa at 1550 nm (nm) | 303 | 279 | 277 | 301 |
| Lateral load at 1550 nm (dB) | 0.3 | 0.9 | 1.1 | 0.1 |
| Pin array at 1550 nm (dB) | 4.0 | 27.7 | 49.1 | 1.5 |
| Attenuation at 1550 nm (dB/km) | 0.168 | 0.170 | 0.170 | 0.168 | ments, 5000 nm or greater. Examples 17-24 in Table 4 have an $LP_{02}$ theoretical mode cutoff of greater than 1100 nm, in some embodiments, >1700 nm, and some other embodiments, >2500 nm. These fibers would exhibit a 22 meter cutoff of greater than 2010 nm. These fibers exhibit a dispersion at 1550 nm between about 20.2 to 21.4 ps/nm/km. These fibers exhibit a dispersion slope at 1550 nm between about 0.06 to 0.07 ps/nm²/km. The core of these fibers is $SiO_2$, doped with F; the graded index profiles of these fibers 300 reflect an alpha value (α) of 2; and the core delta ($\Delta_{1max}$) is 0.00%. The core radius 100 ($r_1$) ranges from 11.6 to 49.0 μm and the effective area ($A_{\mathit{eff}}$) at 1550 nm ranges from approximately 151 to 525 μm² for these variants of fiber 300. In contrast, the Comparative Example 1 ("Comp. Ex. 1") has a $\Delta_{1max}$ equal to 0.2% and an alpha value (α) of 20, indicative of a $GeO_2$-doped $SiO_2$ core with a step-wise core profile. As-modeled, the Comparative Example 1 in Table 4 exhibits a higher attenuation level of ~0.19 dB/km.

TABLE 4

| Parameter | Comp. Ex. 1 | Ex. 15 | Ex. 16 | Ex. 17 | Ex. 18 | Ex. 19 | Ex. 20 | Ex. 21 | Ex. 22 |
|---|---|---|---|---|---|---|---|---|---|
| Core delta, $\Delta_{1max}$ (%) | 0.20 | 0.00 | 0.00 | 0.00 | 0.00 | 0.00 | 0.00 | 0.00 | 0.00 |
| Core radius, $r_1$ (μm) | 6.4 | 14.9 | 21.0 | 11.6 | 16.7 | 25.0 | 39.8 | 25.1 | 49.0 |
| Core alpha, α | 20 | 2 | 2 | 2 | 2 | 2 | 2 | 2 | 2 |
| Cladding delta, $\Delta_4$ (%) | 0.00 | −0.25 | −0.25 | −0.35 | −0.35 | −0.35 | −0.35 | −0.40 | −0.50 |
| $LP_{01}$ cutoff, (nm) | 5000 | 5000 | 5000 | 5000 | 5000 | 5000 | 5000 | 5000 | 5000 |
| $LP_{11}$ cutoff, (nm) | 1505 | 2681 | 3789 | 2489 | 3563 | 5000 | 5000 | 5000 | 5000 |
| $LP_{02}$ cutoff, (nm) | 945 | 1844 | 2602 | 1713 | 2448 | 3665 | 5000 | 3931 | 5000 |
| $LP_{12}$ cutoff, (nm) | 670 | 1272 | 1793 | 1182 | 1686 | 2523 | 4012 | 2706 | 5000 |
| $LP_{01}$ MFD at 1550 nm, (μm) | 14.0 | 17.1 | 20.2 | 13.9 | 16.5 | 20.2 | 25.5 | 19.6 | 25.9 |
| $LP_{01}$ $A_{\mathit{eff}}$ at 1550 nm, (μm²) | 153.9 | 227.8 | 320.2 | 151.2 | 214.7 | 321.4 | 511.5 | 301.4 | 525.4 |
| $LP_{01}$ Dispersion at 1550 nm (ps/nm/km) | 20.2 | 21.3 | 21.4 | 21.0 | 21.2 | 21.2 | 21.2 | 21.1 | 20.9 |
| $LP_{01}$ Slope at 1550 nm (ps/nm²/km) | 0.0615 | 0.0652 | 0.0656 | 0.0651 | 0.0658 | 0.0659 | 0.0659 | 0.0661 | 0.0664 |
| $LP_{01}$ Kappa at 1550 nm (nm) | 328.2 | 327 | 327 | 322 | 323 | 322 | 322 | 320 | 314 |
| $LP_{01}$ Pin array at 1550 nm (dB) | 6.5E+01 | 6.4E+00 | 9.0E−02 | 3.0E−01 | 1.6E−02 | 2.9E−04 | 2.6E−01 | 3.9E−06 | 5.7E−05 |
| $LP_{01}$ Attenuation at 1550 nm (dB/km) | 0.19 | 0.16 | 0.16 | 0.17 | 0.16 | 0.16 | 0.16 | 0.16 | 0.16 |

Tables 4-8 below list characteristics of modeled illustrative Examples 15-43 of fibers 300, 310 and 320 and Comparative Example 1, all transmit few modes at 1550 nm and have relative refractive index profiles as depicted in FIGS. 1-3. In particular, Examples 15-22 in Table 4 correspond to versions of fiber 300, as depicted in FIGS. 1 and 1A. Examples 23-30 in Table 5 also correspond to versions of fiber 300, as depicted in FIGS. 1 and 1A. Examples 31-36 in Table 6 correspond to versions of fiber 310, as depicted in FIG. 2. Examples 37-42 in Table 7 correspond to versions of fiber 320, as depicted in FIG. 3. Finally, Example 43 in Table 8 corresponds to a version of fiber 300, as depicted in FIGS. 1 and 1A.

As Table 4 makes clear, the modeling results for variants of optical fiber 300 (Examples 15-22) with core 101 and cladding 141 (see FIGS. 1 and 1A) are few moded at 1550 nm and exhibit attenuation levels of <0.19, even <0.18, and even <0.17 dB/km when operating at a wavelength of 1550 nm with low mode delays between the $LP_{01}$ and $LP_{11}$ modes in the 1500-1600 nm window. Examples 15-22 in Table 4 have an $LP_{11}$ theoretical mode cutoff of greater than 2400 nm, in some embodiments, >3500 nm, and some other embodi- Table 5 below provides the modeling results for variants of optical fiber 300 (Examples 23 to 30) with core 101 and cladding 141 (see FIGS. 1 and 1A) configured for few mode operation with smaller fiber radii than those depicted in Table 5. These variants of optical fiber 300 have attenuation levels that range from 0.16 to 0.21 dB/km with low mode delays at a wavelength of 1550 nm. The core of these fibers is $SiO_2$, doped with F; the graded index profiles of these fibers 300 reflect an alpha value (α) that ranges from 2 to 5; and the core delta $\Delta_{1max}$ is 0.00%. The core radius 100 ($r_1$) ranges from 7.5 to 14.9 μm and the effective area ($A_{\mathit{eff}}$) at 1550 nm ranges from approximately 99 to 146 μm² for these variants of fiber 300. The $LP_{01}$ and $LP_{11}$ mode field diameters for these examples are between about 11.1-13.6, and 11.3 to 13.7 microns, respectively. These fibers exhibit $LP_{01}$ dispersion at 1550 nm between about 20.5 to 21.4 ps/nm/km. These fibers exhibit $LP_{11}$ dispersion at 1550 nm between about 13.6 to 20.9 ps/nm/km. The delay (in absolute ns/km) between the $LP_{01}$ and $LP_{11}$ modes in the 1500-1600 nm window is <|0.8| ns/km (e.g., Ex. 25), in some embodiments, <|0.5| ns/km (e.g., Ex. 28), in some other embodiments, <|0.2| ns/km (e.g., Ex. 29), still in some other embodiments, <|0.1| ns/km (e.g., Ex. 30), and in some other embodiments, <|0.01| ns/km (e.g., Ex. 32).

TABLE 5

| Parameter | Ex. 23 | Ex. 24 | Ex. 25 | Ex. 26 | Ex. 27 | Ex. 28 | Ex. 29 | Ex. 30 |
|---|---|---|---|---|---|---|---|---|
| Core delta, $\Delta_{1max}$ (%) | 0.0 | 0.0 | 0.0 | 0.0 | 0.0 | 0.0 | 0.0 | 0.0 |
| Core radius, $r_1$ (μm) | 7.5 | 10.7 | 8.3 | 9.5 | 11.1 | 14.9 | 13.7 | 12.7 |
| Core alpha, α | 5 | 2.5 | 3 | 2.5 | 2.2 | 2 | 2 | 2 |
| Cladding delta, $\Delta_4$ (%) | −0.40 | −0.40 | −0.50 | −0.50 | −0.50 | −0.60 | −0.70 | −0.80 |
| $LP_{02}$ Cutoff (nm) | 1373 | 1779 | 1590 | 1766 | 2014 | 2878 | 2859 | 2834 |
| $LP_{11}$ Cutoff (nm) | 2098 | 2587 | 2348 | 2569 | 2892 | 4048 | 4020 | 3988 |
| $LP_{01}$ Dispersion (ps/nm/km) | 21.4 | 21.3 | 21.2 | 21.1 | 21.1 | 20.8 | 20.6 | 20.5 |
| $LP_{01}$ Effective Area (μm²) | 108.5 | 137.3 | 98.9 | 109.0 | 123.2 | 146.0 | 124.3 | 107.8 |
| $LP_{01}$ MFD (μm) | 11.6 | 13.2 | 11.1 | 11.7 | 12.5 | 13.6 | 12.6 | 11.7 |
| $LP_{01}$ Pin Array (dB) | 0.03 | 0.02 | 0.00 | 0.00 | 0.00 | 0.00 | 0.00 | 0.00 |
| $LP_{01}$ Lateral Load (dB) | 0.68 | 3.01 | 0.38 | 0.71 | 1.62 | 5.07 | 2.55 | 0.74 |
| $LP_{01}$ Group Index | 1.468984 | 1.468577 | 1.470234 | 1.470070 | 1.469946 | 1.471309 | 1.472758 | 1.474205 |
| $LP_{01}$ Attenuation at 1550 nm (dB/km) | 0.162 | 0.161 | 0.172 | 0.172 | 0.172 | 0.184 | 0.195 | 0.206 |
| $LP_{11}$ Dispersion (ps/nm/km) | 13.6 | 19.3 | 16.5 | 18.5 | 19.9 | 20.9 | 20.7 | 20.6 |
| $LP_{11}$ Effective Area (μm²) | 210.5 | 270.3 | 193.7 | 215.1 | 245.2 | 292.5 | 249.1 | 216.0 |
| $LP_{11}$ MFD (μm) | 11.8 | 13.2 | 11.3 | 11.8 | 12.6 | 13.7 | 12.6 | 11.7 |
| $LP_{11}$ Pin Array (dB) | 87.63 | 15.69 | 9.30 | 3.29 | 0.81 | 0.00 | 0.00 | 0.00 |
| $LP_{11}$ Lateral Load (dB) | 196.60 | 1877.63 | 83.68 | 249.67 | 897.74 | 4078.83 | 1743.75 | 297.94 |
| $LP_{11}$ Group Index | 1.468990 | 1.468585 | 1.470240 | 1.470071 | 1.469943 | 1.471309 | 1.472758 | 1.474205 |
| $LP_{11}$ Delay at 1500 nm (ns/km) | 0.3841 | 0.1188 | 0.2376 | 0.1264 | 0.0405 | −0.0018 | −0.0022 | −0.0028 |
| $LP_{11}$ Delay at 1550 nm (ns/km) | 0.0197 | 0.0264 | 0.0202 | 0.0057 | −0.0126 | 0.0002 | 0.0003 | −0.0004 |
| $LP_{11}$ Delay at 1600 nm (ns/km) | −0.4100 | −0.0842 | −0.2361 | −0.1398 | −0.0771 | 0.0009 | 0.0002 | −0.0005 |

The modeling results for variants of optical fiber 310 (Examples 31-36) with core 101 and depressed cladding layer 3 and outer cladding layer 4 (see FIG. 2) are listed below in Table 6. Also set forth is the width $m_1$ of depressed cladding layer 3. These fibers 310 are configured for few mode operation and exhibit low attenuation levels of <0.19 dB/km, even <0.18 dB/km, ranging from 0.163 dB/km to 0.165 dB/km when operating at a wavelength of 1550 nm. The core of these fibers is $SiO_2$, doped with F; the graded index cores of these fibers 310 reflect an alpha values (α) of 2; and the core delta ($\Delta_{1max}$) is approximately 0.0% for each of them. The effective area ($\Delta_{eff}$) of these fibers 310 at 1550 nm ranges from approximately 150 to 257 μm². The $LP_{01}$ mode field diameters for these examples are between about 13.8-18.1 microns. Examples 31-36 in Table 6 have an $LP_{11}$ mode cutoff of greater than 1700 nm, in some embodiments, >2500 nm, and some other embodiments, 5000 nm or greater. Examples 33-38 in Table 6 have an $LP_{02}$ mode cutoff of greater than 850 nm, in some embodiments, >1250 nm, and some other embodiments, >2600 nm. These fibers exhibit $LP_{01}$ dispersion and dispersion slope values at 1550 nm between about 20.5 to 21.6 ps/nm/km, and about 0.1 ps/nm²/km, respectively.

The modeling results for variants of optical fiber 320 (Examples 37-42) with core 101 and cladding layers 2, 3 and 4 (as shown in FIG. 3) are listed below in Table 7. Also set forth are the width $w_{c2}$ of depressed cladding region 3 as well as the distance the depressed cladding region 3 is offset from core 101 by a width $w_{c1}$ of inner cladding region 2. As shown below, these fibers 320 are configured for few mode operation and exhibit low attenuation levels of <0.19 dB/km, even <0.18 dB/km, and ranging from 0.163 dB/km to 0.165 dB/km when operating at a wavelength of 1550 nm. The core of these fibers is $SiO_2$, doped with F; the graded index profiles of these fibers 320 reflect and alpha value (α) of 2; and the core delta ($\Delta_{1max}$) is approximately 0.0% for each of them. The effective area ($\Delta_{eff}$) of these fibers 320 at 1550 nm ranges from approximately 151 to 269 mm². The $LP_{01}$ mode field diameters for these examples are between about 13.8-18.4 microns. Examples 37-42 in Table 7 have an $LP_{11}$ mode cutoff of greater than 2400 nm, in some embodiments, >3400 nm, and some other embodiments, 5000 nm or greater. Examples 37-42 in Table 7 have an $LP_{02}$ mode cutoff of greater than 1200 nm, in some embodiments, >1800 nm, and some other embodiments, >2500 nm. These fibers exhibit $LP_{01}$ disper-

TABLE 6

| Parameter | Ex. 31 | Ex. 32 | Ex. 32 | Ex. 34 | Ex. 35 | Ex. 36 |
|---|---|---|---|---|---|---|
| Core delta, $\Delta_{1max}$ (%) | 0.00 | 0.00 | 0.00 | 0.00 | 0.00 | 0.00 |
| Core radius, $r_1$ (μm) | 17.5 | 16.9 | 13.9 | 19.2 | 29.4 | 37.3 |
| Core alpha, α | 2 | 2 | 2 | 2 | 2 | 2 |
| Moat delta, $\Delta_2$ (%) | −0.30 | −0.40 | −0.50 | −0.50 | −1.10 | −1.20 |
| Moat radius, $r_1 + m_1$ (μm) | 29.2 | 28.2 | 18.6 | 25.6 | 35.3 | 44.7 |
| Outer cladding layer delta, $\Delta_4$ (%) | −0.20 | −0.20 | −0.30 | −0.30 | −0.60 | −0.70 |
| $LP_{01}$ Cutoff (nm) | 4560 | 3464 | 4407 | 5000 | 5000 | 5000 |
| $LP_{11}$ Cutoff (nm) | 2052 | 1705 | 1892 | 2605 | 5000 | 5000 |
| $LP_{02}$ Cutoff (nm) | 1364 | 1141 | 1260 | 1731 | 3570 | 5000 |
| $LP_{12}$ Cutoff (nm) | 1026 | 861 | 949 | 1300 | 2676 | 3788 |
| MFD at 1550 nm (μm) | 17.6 | 16.1 | 13.8 | 16.2 | 16.4 | 18.1 |
| $A_{eff}$ at 1550 nm (μm²) | 244.3 | 204.2 | 150.1 | 206.8 | 212.3 | 257.0 |
| Dispersion at 1550 nm (ps/nm/km) | 21.6 | 21.6 | 21.4 | 21.4 | 20.7 | 20.5 |
| Slope at 1550 nm (ps/nm²/km) | 0.1 | 0.1 | 0.1 | 0.1 | 0.1 | 0.1 |
| Kappa at 1550 nm (nm) | 330 | 330 | 326 | 325 | 310 | 305 |
| Pin array at 1550 nm (dB) | 1.2 | 0.4 | 0.0 | 0.4 | 0.0 | 0.0 |
| $LP_{01}$ Attenuation (dB/km) | 0.163 | 0.163 | 0.165 | 0.163 | 0.163 | 0.163 | sion and dispersion slope values at 1550 nm between about 20.4 to 21.4 ps/nm/km, and about 0.07 ps/nm²/km, respectively.

As noted earlier, conventional single mode fibers with a step index profile (e.g., fibers possessing a core of $GeO_2$-doped $SiO_2$) typically have a core delta ($\Delta_{1max}$) of about

TABLE 7

| Parameter | Ex. 37 | Ex. 38 | Ex. 39 | Ex. 40 | Ex. 41 | Ex. 42 |
|---|---|---|---|---|---|---|
| Core delta, $\Delta_{1max}$ (%) | 0.00 | 0.00 | 0.00 | 0.00 | 0.00 | 0.00 |
| Core radius, $r_1$ (μm) | 12.6 | 16.8 | 16.8 | 22.4 | 27.0 | 36.3 |
| Core alpha, α | 2 | 2 | 2 | 2 | 2 | 2 |
| First cladding layer delta, $\Delta_2$ (%) | −0.40 | −0.50 | −0.60 | −0.80 | −0.80 | −1.05 |
| Trench delta, $\Delta_3$ (%) | −0.80 | −0.80 | −0.80 | −1.10 | −1.15 | −1.50 |
| Trench start radius, $r_1 + w_{c1}$ (μm) | 13.4 | 17.9 | 17.9 | 23.8 | 29.7 | 38.0 |
| Trench end radius, $r_1 + w_{c2}$ (μm) | 17.6 | 23.5 | 23.5 | 31.3 | 35.1 | 44.6 |
| Outer cladding layer delta, $\Delta_4$ (%) | −0.40 | −0.50 | −0.50 | −0.60 | −0.60 | −0.75 |
| $LP_{01}$ cutoff (nm) | 5000 | 5000 | 5000 | 5000 | 5000 | 5000 |
| $LP_{11}$ cutoff (nm) | 2494 | 3811 | 3494 | 4790 | 5000 | 5000 |
| $LP_{02}$ cutoff (nm) | 1662 | 2512 | 2309 | 3182 | 3853 | 5000 |
| $LP_{12}$ cutoff (nm) | 1256 | 1880 | 1729 | 2386 | 2884 | 4225 |
| MFD at 1550 nm (μm) | 13.8 | 15.1 | 14.5 | 15.5 | 17.1 | 18.4 |
| $A_{eff}$ at 1550 nm (μm²) | 151.0 | 180.3 | 164.6 | 189.3 | 228.6 | 267.5 |
| Dispersion at 1550 nm (ps/nm/km) | 21.4 | 21.0 | 21.0 | 20.7 | 20.7 | 20.4 |
| Slope at 1550 nm (ps/nm²/km) | 0.07 | 0.07 | 0.07 | 0.07 | 0.07 | 0.07 |
| Kappa at 1550 nm (nm) | 321.0 | 315.3 | 315.5 | 310.3 | 310.1 | 299.5 |
| Pin array at 1550 nm (dB) | 1.3E−02 | 1.6E−06 | 2.4E−06 | 1.7E−06 | 3.8E−08 | 5.2E−11 |
| $LP_{01}$ Attenuation (dB/km) | 0.165 | 0.164 | 0.164 | 0.164 | 0.163 | 0.163 |

The modeling results for another variant of optical fiber 320 (Example 43) with core region 1 and cladding layers 2, 3, and 4 (see FIG. 3) is listed below in Table 8. Here, the version of optical fiber 320 modeled in Table 8 as Example 43 has a first cladding layer 2). Further, the relative refractive index $\Delta_3$ of the depressed cladding layer 3 (is −0.4. As such, the Example 45 optical fiber 320 essentially has one core region, along with one cladding region (i.e., cladding layers 2 and 4). As outlined in Table 8, this fiber 320 is few moded at 1550 nm and exhibits a low attenuation level of 0.166 dB/km at a wavelength of 1550 nm. The core of this fiber is $SiO_2$, doped with F; the graded index profile of this fiber 320 reflects an alpha value (α) of 2; and the core delta ($\Delta_{1max}$) is approximately 0.0%. The effective area ($A_{eff}$) of this fiber at 1550 nm is about 130 mm². The $LP_{01}$ and $LP_{11}$ mode field diameters for Example 43 are about 12.9 microns. Example 43 in Table 8 has an $LP_{11}$ mode cutoff of greater than 2100 nm and an $LP_{02}$ mode cutoff of greater than 1400 nm. This fiber exhibits $LP_{01}$ dispersion and dispersion slope at 1550 nm of about 21.3 ps/nm/km, and about 0.1 ps/nm²/km, respectively.

TABLE 8

| Parameter | Ex. 43 |
|---|---|
| Core delta, $\Delta_{1max}$ (%) | 0.0 |
| Core radius, $r_1$ (μm) | 10.9 |
| Core alpha, α | 2 |
| First cladding layer delta, $\Delta_2$ (%) | 0 |
| Second cladding layer delta, $\Delta_3$ (%) | −0.40 |
| Inner radius of second clad layer, $r_2$ (μm) | 12.5 |
| Outer radius of second clad layer, $r_3$ (μm) | 18 |
| Outer cladding layer delta, $\Delta_4$ (%) | −0.40 |
| $LP_{01}$ MFD (μm) | 12.9 |
| $LP_{01}$ $A_{eff}$ (μm²) | 131.2 |
| $LP_{01}$ Dispersion (ps/nm/km) | 21.3 |
| $LP_{01}$ Dispersion slope (ps/nm²/km) | 0.1 |
| $LP_{01}$ Pin Array (dB) | 0.0 |
| $LP_{01}$ Attenuation (dB/km) | 0.166 |
| $LP_{11}$ Cutoff (nm) | 2189 |
| $LP_{11}$ MFD (μm) | 12.9 |
| $LP_{11}$ $A_{eff}$ (μm²) | 262.5 |
| $LP_{11}$ Dispersion (ps/nm/km) | 21.6 |
| $LP_{11}$ Dispersion slope (ps/nm²/km) | 0.1 |
| $LP_{11}$ Pin Array (dB) | 21.7 |
| $LP_{21}$ Cutoff (nm) | 1466 |
| $LP_{02}$ Cutoff (nm) | 1465 |

0.34%, and a core radius between 4 to 4.5 μm. The effective area of these fibers is about 80 μm². For high data rate long haul systems and associated applications, nonlinear effects in the fiber are dominant factors that limit system performance. To reduce the nonlinear effects, the effective area has to increase. For single mode fiber configurations, the effective area can be increased by reducing the core delta and increasing the core radius. However, this approach often results in higher bending losses. This can be seen in the Comparative Example 1 in Table 4. In this example, the core delta is 0.2% ($GeO_2$-doped $SiO_2$), and the core radius is 6.4 μm. The fiber operates in a single mode with an effective area of 154 μm². The effective area is limited to about 100-150 μm² because of the bending limitation.

The optical fibers 300, 310, 320 and examples outlined in Tables 4 through 8 demonstrate approaches for increasing the effective area ($A_{eff}$) for optical fibers beyond 150 μm². These approaches result in optical fiber designs configured to operate with few modes at 1550 nm and having low attenuation levels suitable for high data rate transmission over long distances. In particular, to increase the effective area, one can increase the cutoff wavelengths of higher order modes and the fiber becomes a few mode, configured fiber.

In an ideal case, a fiber configured to propagate few modes at 1550 nm (e.g., fibers 300, 310 and/or 320 depicted in FIGS. 1-3A and modeled in Tables 4-8) is used for high data rate long distance transmission by launching only the fundamental mode into the fiber. Theoretically, step index profiles in the core of the fibers might be an option if the fundamental mode could be launched efficiently in the fiber. In practice, however, it is hard to avoid offset and other undesired signal transmission angles in splices and connectors. Further, it is difficult to avoid perturbations, such as macro- and micro-bending in the optical fiber that can excite higher order modes that have very different time delays in a step index fiber. In addition, mode conversion between the fundamental mode and higher order modes can cause multiple-path interference (MPI) problems, producing noise that degrades system performance. In principle, the time delays and MPI can be compensated using digital signal processing (DSP). However, it is preferable to reduce the amount of time delays and MPI to simplify the DSP design and lower the system costs.

In view of these considerations, the optical fiber designs 300, 310 and 320 (as exemplified by the examples listed in Tables 4-8) are configured for few mode operation, and to minimize modal dispersions and time delays. An aspect of these optical fiber designs is the use of the graded index profile within the core of the fiber. As outlined earlier, the alpha value of the fiber 300, 310 and 320 can be set such that $0.5 \leq \alpha \leq 5$. More preferably, the alpha value should be approximately 2 to have low time delays.

The optimal alpha value ($\alpha$) depends on the core dopant and process type (e.g., OVD, VAD, MCVD, or PCVD). In general, the optimum alpha value is in the range of 1.9 to 2.1 at an operating wavelength of 1550 nm. The time delay depends on the maximum core dopant level. A low core delta ($\Delta_{1max}$) is preferred for a small delay. At the optimum alpha value, the time delay is less than about 4 ps/km for core deltas ($\Delta_{1max}$) less than +0.5% and the delay is relatively constant with little variability. Accordingly, these optical fibers are suitable for wavelength-division multiplexing (WDM) operation.

Another benefit of a graded index profile used in optical fibers 300, 310 and 320 for high speed and long haul applications is that because the group indices of all the modes are about the same with an optimum alpha value, the power fluctuation due to MPI (multi path interference) within a wavelength channel is significantly reduced. The low residual time delay and MPI can be compensated by digital signal processing in the receiver.

Low-attenuation optical fibers 300, 310 and 320 that are doped with fluorine may still be prone to "stress-optic" effects. In particular, these fibers can be prone to high internal stresses associated with their production that can degrade optical performance, despite the use of a graded index core. In particular, the internal stresses generated during the production of these fibers can influence their refractive index profiles in a way that compromises their optical transmission properties.

Figure 4:
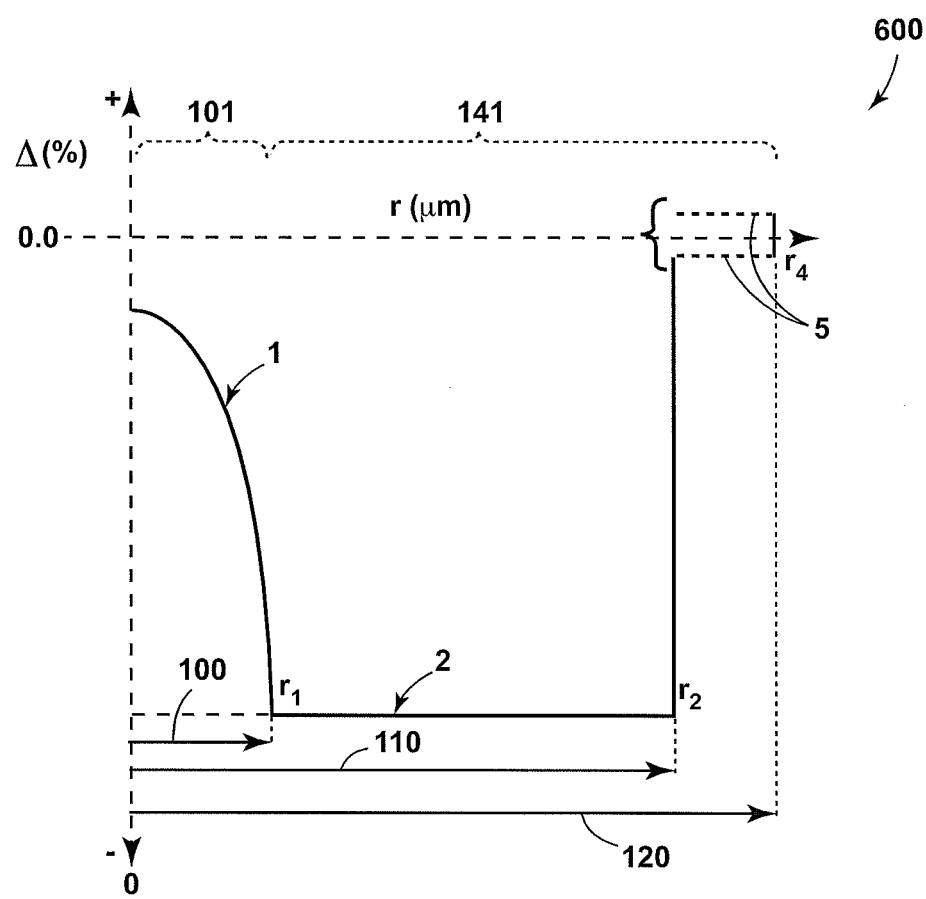
FIG. 4 is schematic diagram that depicts refractive index as a function of fiber radius for an optical fiber with a core, an inner cladding and an outer cladding.

A modified version of the optical fibers 300, 310 and 320 (see FIG. 1-3) is exemplified by an optical fiber 600, depicted in FIGS. 4 and 4A. Fiber 600 is configured to minimize "stress-optic" effects and to operate at a single mode or a plurality of modes. As shown, fiber 600 possesses a core 101 with a radius 100 ($r_1$). The core 101 can have an alpha profile of about 0.5 to 5, forming a graded, relative refractive index profile 1 (see FIG. 4). Preferably, core 101 exhibits an alpha profile from about 1 to 3. The relative refractive index 1 ($\Delta_1$) of the core 101 varies as a function of fiber radius (r). The relative refractive index profile 1 reaches its peak refractive index change (i.e., core delta or $\Delta_{1max}$) at the core radius 100. Note that the relative refractive index profiles of fiber 600 are plotted in FIG. 4 using pure $SiO_2$ as a baseline relative refractive index equal to zero.

Further, the core 1, from its center to its outer radius 100 primarily contains $SiO_2$ doped with F. Preferably, the core 1 comprises $GeO_2$-limited $SiO_2$ doped with fluorine. Optionally, the core 1 may also be doped with Cl, $K_2O$, and/or $P_2O_5$. These dopants may be introduced into the core 101 by OVD, VAD, MCVD, and PCVD processing methods, as described in the foregoing.

As depicted in FIG. 4, fiber 600 has an inner cladding 2 with a radius 110 ($r_2$). The thickness of the inner cladding 2 is the difference between its radius 110 and the radius 100 of the core 101. The inner cladding 2 preferably primarily contains $SiO_2$ doped with F to form a step-shaped refractive index profile 2 ($\Delta_2$). The fluorine concentration of the inner cladding 2, $F_{inner\ cladding}$, exceeds the F concentration in core region 1. Further, the relative refractive index ($\Delta_2$), of the inner cladding 2 ($\Delta_2$), is less than the maximum relative refractive index ($\Delta_1$) of the core. Optionally, Cl and/or $B_2O_3$ can be employed as dopants in the inner cladding 2.

Fiber 600, as depicted in FIG. 4, also includes an outer cladding 5 with a radius 120 ($r_3$). The thickness of the outer cladding 5 is the difference between its outer radius 120 and the outer radius of the inner cladding 2. Outer cladding 5 primarily contains $SiO_2$ having a fluorine concentration, $F_{outer\ cladding}$, that is equal to or less than the minimum amount of fluorine in the core region 1. The outer cladding 5 has a relative refractive index $\Delta_5$, and an outer radius $r_4$. The relative refractive index 3 ($\Delta_3$) of the outer cladding 5 is typically greater than the relative refractive indices $\Delta_1$ and $\Delta_2$ of the core 1 and inner cladding 2, respectively. The outer cladding 5 may comprise silica with fluorine at a concentration approximately equal to or less than the minimum concentration of the fluorine in the core. In some embodiments, the absolute value $|\Delta_1 max - \Delta_5|$ may be between 0.0 and 0.5, in other embodiments, $|\Delta_1 max - \Delta_5|$ may be between 0.0 and 0.2.

Preferably, the outer cladding 5 is stiff in the sense that its viscosity is less than the viscosity of the core 101 and the inner cladding 2. It is also preferable to fabricate outer cladding 5 to be substantially free of chlorine. The presence of chlorine in the outer cladding 5 can be limited by introducing carbon monoxide during the processes used to consolidate the outer cladding 5.

Optical fiber 600 may be fabricated with drawing processes with a draw tension of approximately 90 g or less. Preferably, the draw tension is set at less than 45 g, and more preferably, set between 30 g and 45 g. Fiber 600, formed with these processing parameters, is even less susceptible to draw-induced stresses that can be detrimental to the optical transmission properties of the fiber, including waveguide propagation performance. Optical fibers 600, when processed and configured according to the foregoing, are estimated to possess an attenuation of less than 0.165 dB/km, and even less than 0.16 dB/km, at operating wavelengths of 1550 nm.

Figure 5:
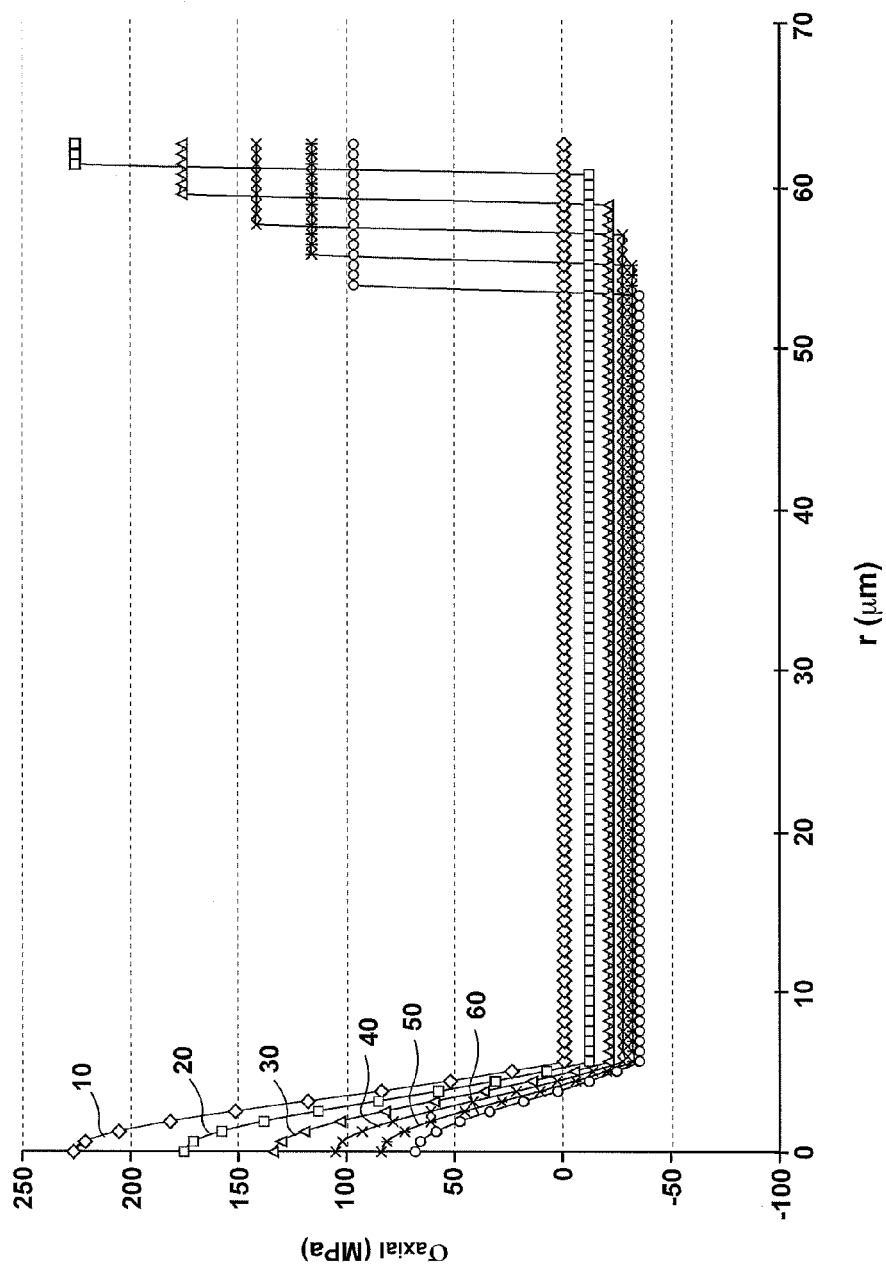
FIG. 5 is a chart of estimated fiber axial stress (MPa) vs. fiber radius ($\mu m$) for an optical fiber, as configured according to FIG. 4 and fabricated with a draw tension of 90 g.
Figure 6:
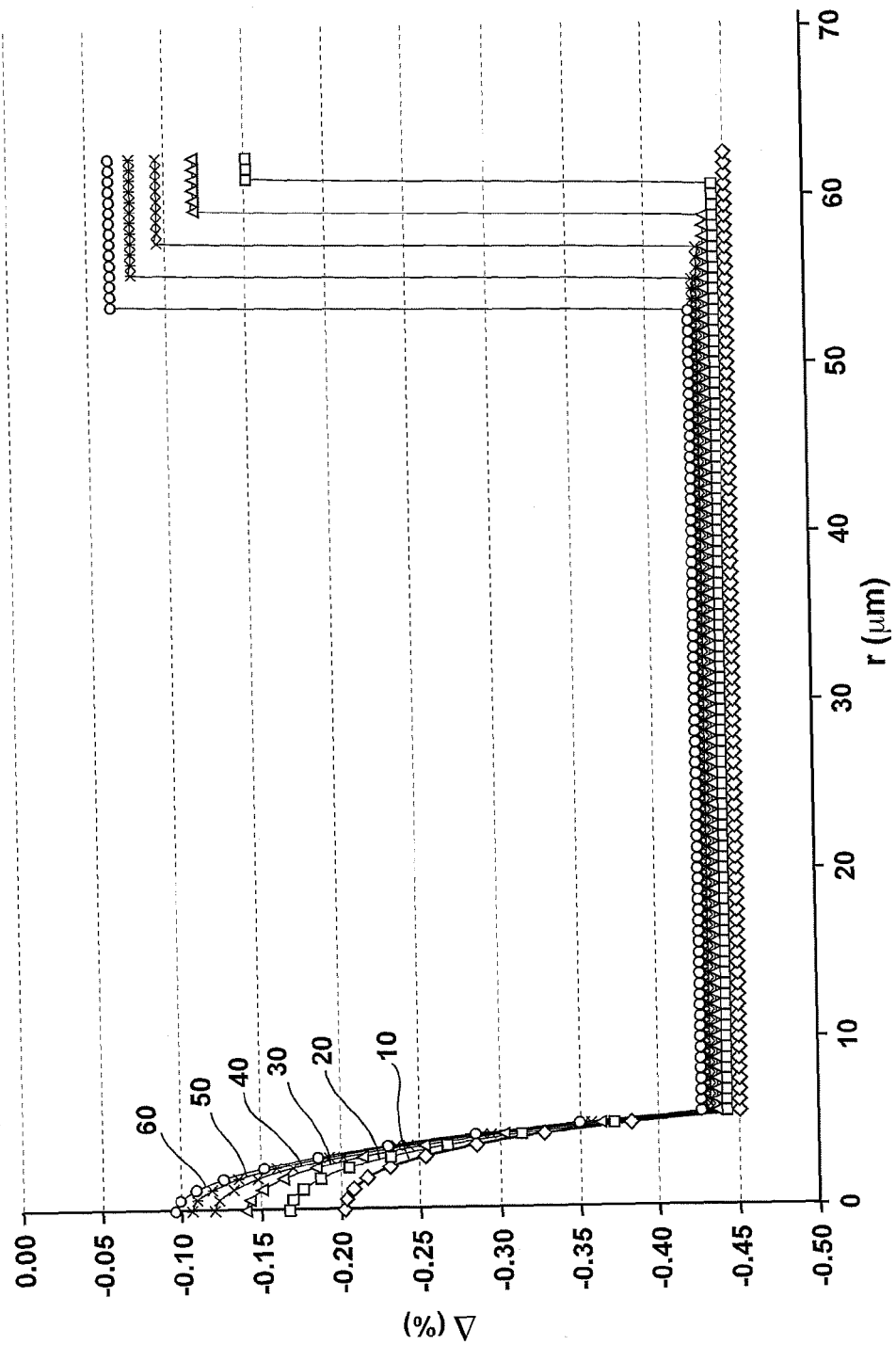
FIG. 6 is a chart of estimated relative refractive index (%) vs. fiber radius ($\mu m$) for the optical fiber depicted in FIG. 5.

A fluorine-doped optical fiber without a stiff outer cladding may have draw-induced stresses that can negatively affect its refractive index profile. For example, FIGS. 5 and 6 are charts of estimated fiber axial stress (MPa) and estimated relative refractive index (%) vs. fiber radius (μm), respectively, for optical fibers 10, 20, 30, 40, 50 and 60 configured comparably to the optical fiber 600 described in the foregoing. In particular, fibers 10-60 are depicted with outer cladding 5 thicknesses of 0, 2, 4, 6, 8 and 10 μm, respectively. More specifically, the optical fibers 10-60 depicted in FIGS. 5 and 6 are formed with a draw tension of 90 g, and comprise a core region of germania-limited $SiO_2$ doped with a graded index of F at 0.18% by weight, an inner cladding of $SiO_2$ doped with F at 1.61% by weight, and an outer cladding having less than 0.18% by weight. When no outer cladding is present in the fiber (i.e., fiber 10 with an outer cladding thickness equal to 0 μm), the axial stress in the core is approximately 230 MPa in tension (see FIG. 5). Further, the peak relative refractive index $\Delta_{1max}$ of the core 101 is −0.20%, and the relative refractive index $\Delta_2$ of the inner cladding 2 is −0.45%. This results in a refractive index profile in the fiber characterized by the difference between the maximum core index $\Delta_{1max}$ and the inner cladding index 2 ($\Delta_2$)—only 0.25%Δ (See FIG. 6). Accordingly, the relatively high internal tensile stress in the core region of the fiber leads to a reduced refractive index differential between the core and the inner cladding of the fiber. In turn, these effects result in decreased waveguide propagation performance.

In contrast, a stiff outer cladding 5 can be employed in the fiber, as described in the foregoing in connection with fiber 600. For example, when an outer cladding 5 is present in the fiber (i.e., see fiber 60 which has an outer cladding 5 thickness equal to 10 μm), the fiber exhibits improved stress levels and optical characteristics, as depicted in FIGS. 5 and 6. The maximum axial stress level in the core 101 of drops to approximately 70 MPa in tension (see FIG. 5). Further, the difference between the maximum core index $\Delta_{1max}$ and the inner cladding index $\Delta_2$ increases to approximately 0.325%Δ (see FIG. 6).

Figure 7:
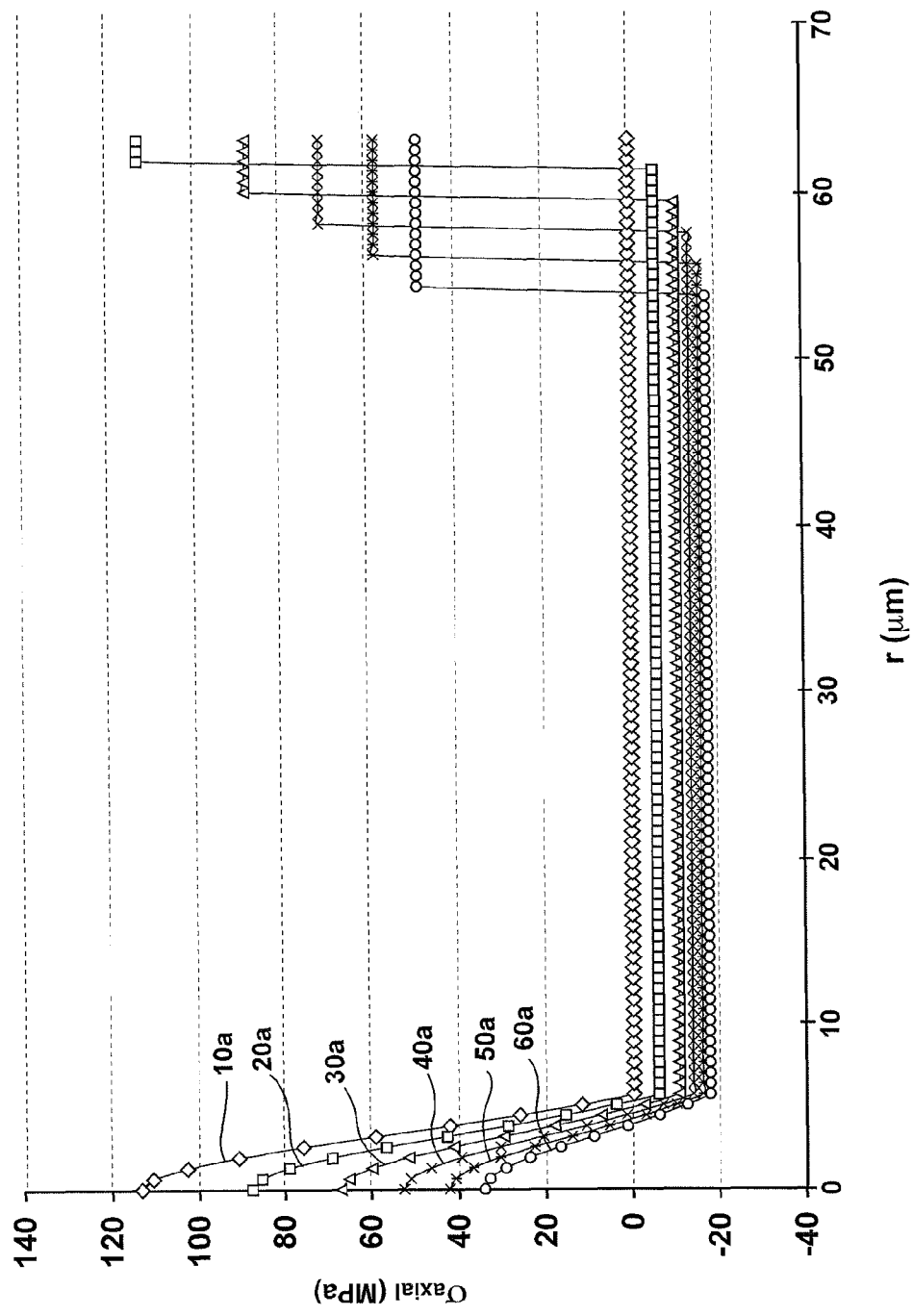
FIG. 7 is a chart of estimated fiber axial stress (MPa) vs. fiber radius ($\mu m$) for an optical fiber, as configured according to FIG. 4 and fabricated with a draw tension of 45 g.
Figure 8:
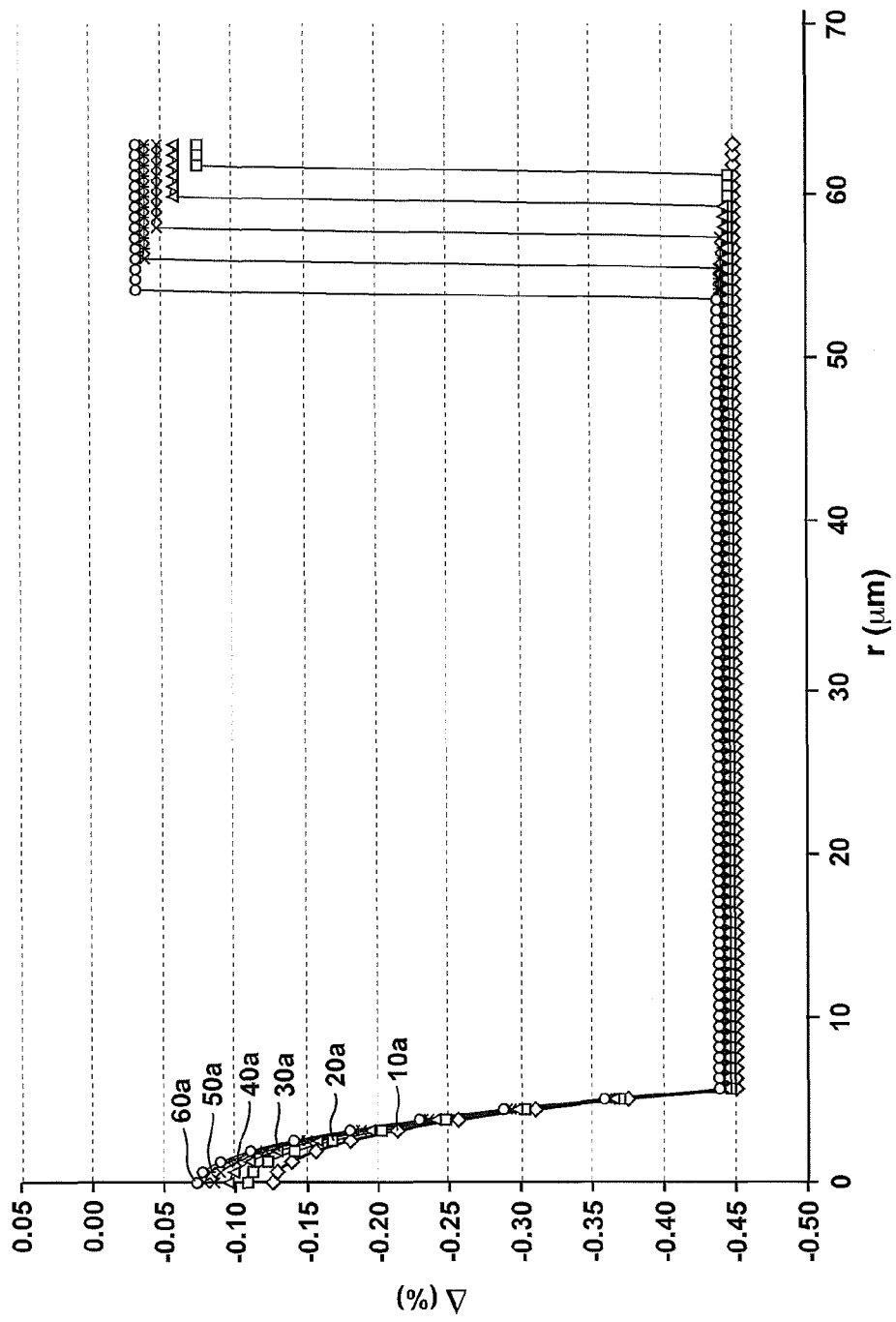
FIG. 8 is a chart of estimated relative refractive index (%) vs. fiber radius ($\mu m$) for the optical fiber depicted in FIG. 7.

The optical fiber 600 can also be processed at a lower draw tension to further improve its optical transmission performance properties. More specifically, FIGS. 7 and 8 are charts of estimated fiber axial stress (in MPa [mega Pascals]) and estimated relative refractive index (%) vs. fiber radius (μm), respectively, for optical fibers 10a, 20a, 30a, 40a, 50a and 60a (comparable to fiber 600 discussed earlier) fabricated with a draw tension of 45 g. Fibers 10a-60a have an outer cladding thickness 5 of 0, 2, 4, 6, 8 and 10 nm, respectively. Otherwise, these fibers are configured comparably to those fibers described in FIGS. 5 and 6. When the outer cladding 5 is present in fiber (i.e., fiber 60a with an outer cladding thickness equal to 10 μm), the maximum axial tensile stress level in the core 101 drops to approximately 35 MPa in tension (see FIG. 7). Further, the difference between the maximum core index $\Delta_{1max}$ and the inner cladding index $\Delta_2$ increases to approximately 0.36%Δ (see FIG. 8).

The outer cladding 5 of fiber 600 may also be configured to comprise $SiO_2$ doped with a small percentage of by weight of nitrogen (N) to convert some $SiO_2$ to silicon oxynitride ($SiO_xN_y$) where $1<x<2$ and $0<y<1$. In particular, outer cladding 5 may be doped with greater than about 0.1% by weight N. In some embodiments, outer cladding 5 comprises greater than about 0.1 to about 1.0% by weight of nitrogen. Doping the outer cladding 5 with nitrogen can increase its stiffness.

Figure 9:
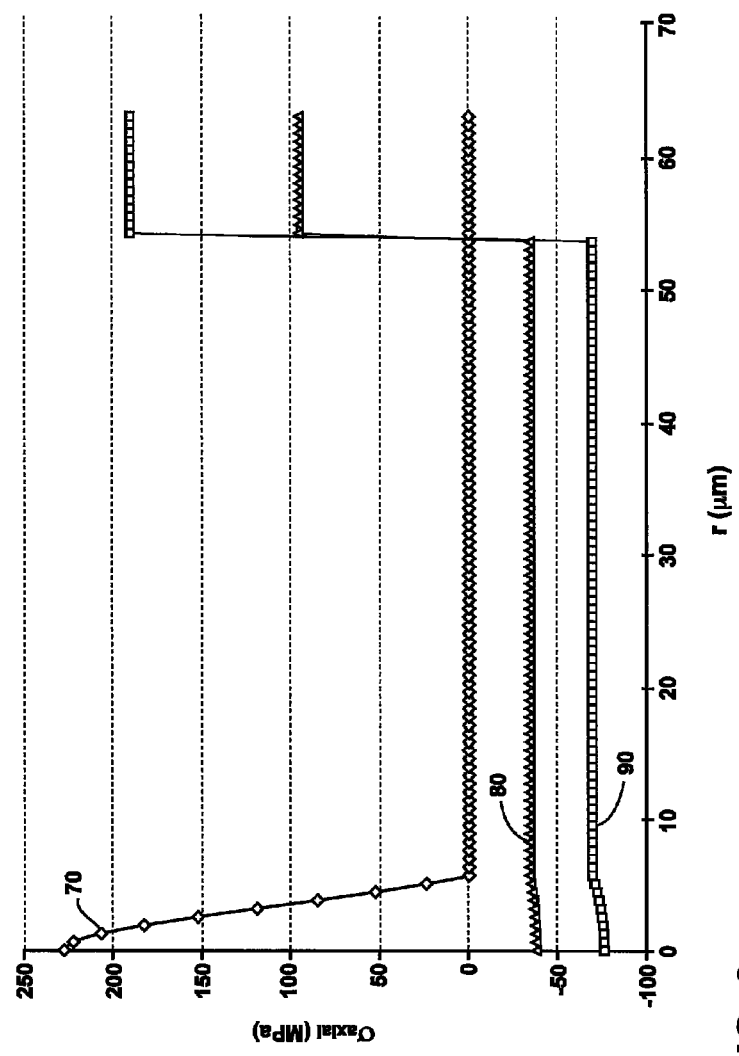
FIG. 9 is a chart of estimated fiber axial stress (MPa) vs. fiber radius ($\mu m$) for optical fibers configured according to FIG. 4 with a draw tension of 45 g and 90 g and an outer cladding comprising $SiO_xN_y$.
Figure 10:
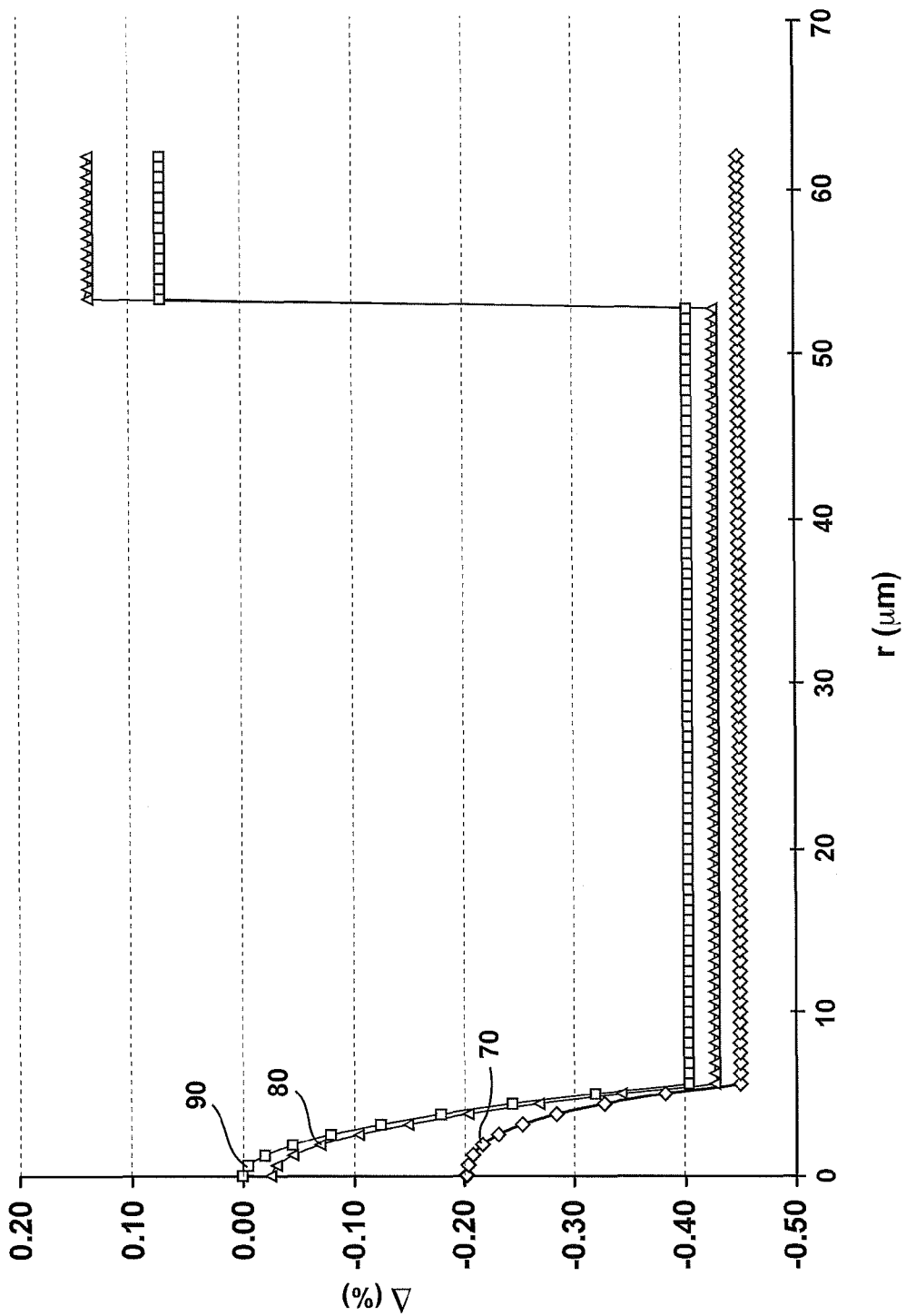
FIG. 10 is a chart of estimated relative refractive index (%) vs. fiber radius ($\mu m$) for the optical fibers depicted in FIG. 9.

The modeled data shown in FIGS. 9 and 10 demonstrate that the use of $SiO_xN_y$ in the outer cladding 5 can reduce the axial tensile stress levels (in MPa) and increase the relative refractive index (%) vs. fiber radius (nm), respectively, for the fiber. As depicted in these figures, fibers 80 and 90 are configured according to fiber 600 described in the foregoing, but otherwise include a silica outer cladding 5 characterized by a thickness of 10 nm, doping with 0.2% nitrogen by weight, and prior processing at a draw tension of 90 g and 45 g, respectively. A fiber 70 without an outer cladding 5 is also depicted in FIGS. 9 and 10 for comparison. More specifically, fibers 80 and 90, each configured with a nitrogen-doped stiff outer cladding 5 possess no apparent tensile stress and small amounts of compressive stress in their core regions (see FIG. 9). Further, the difference between the maximum core index $\Delta_{1max}$ and the relative refractive index $\Delta_2$ of the inner cladding 2 is approximately −0.40%Δ (see FIG. 10). In contrast, the fiber 70 lacking a stiff outer cladding is estimated to possess core axial tensile stress levels of approximately 230 MPa and a −0.25%Δ relative refractive index differential between the core 101 and the inner cladding 2. The properties for the fiber 70 without an outer cladding are thus inferior to the estimated results for fibers 80 and 90 with the stiff, nitrogen-doped outer cladding 5. Put another way, the use of a stiff outer cladding reduces internal fiber axial stress levels and also provides a higher, and therefore better, relative refractive index differential between the core and the inner cladding.

Although the core regions of the fibers disclosed herein may optionally contain some level of alkali, the embodiments disclosed herein may employ core regions which are substantially free of alkali, and in many embodiments the core regions preferably contain no alkali.

It is to be understood that the foregoing is exemplary only and is intended to provide an overview for the understanding of the nature and character of the fibers which are defined by the claims. The accompanying drawings are included to provide a further understanding of the preferred embodiments and are incorporated and constitute part of the specification. The drawings illustrate various features and embodiments which, together with their description, serve to explain the principals and operation. It will be apparent to those skilled in the art that various modifications and variations can be made to the preferred embodiments as described herein without departing from the spirit or scope of the claims.

What is claimed is:

1. An optical fiber, comprising:
   a fiber having a 22 meter cutoff wavelength less than 1530 nm and an $A_{eff}$ at 1550 nm of between 60-100 microns², said fiber comprising
   a core region in the fiber that comprises fluorine-doped silica; and
   a first cladding region in the fiber that surrounds the core region and comprises fluorine-doped silica,
   wherein the core region has a graded refractive index profile having an alpha of about 0.5 to 5, and
   further wherein the first cladding region comprises a depressed region having a relative refractive index that is substantially constant and lower than a relative refractive index of the core region.

2. The fiber according to claim 1, wherein the core region comprises less than 1 wt % $GeO_2$ and $TiO_2$, alone or in combination.

3. The fiber according to claim 1, wherein the core region consists essentially of fluorine-doped silica.

4. The fiber according to claim 2, wherein the core region has a graded refractive index profile with an alpha of about 1 to 3.

5. A few moded optical fiber, comprising:
   a core region that comprises fluorine-doped silica and is configured to transmit optical data in greater than 2 and less than 8 modes at 1550 nm; and
   a cladding in the fiber that surrounds the core region and comprises fluorine-doped silica,
   wherein the core region has a graded refractive index profile with an alpha between about 0.5 to 5 and a radius of approximately 6 to 50 microns.

6. The fiber according to claim 5, wherein the core region comprises less than 1 wt % $GeO_2$ and $TiO_2$, alone or in combination.

7. The fiber according to claim 6, wherein the core region consists essentially of fluorine-doped silica.

8. The fiber according to claim 5, wherein the core region has a graded refractive index profile with an alpha of about 1 to 3.

9. The fiber according to claim 5, wherein the core region is further doped with at least one of the group consisting of chlorine, potassium oxide and phosphorous pentoxide.

10. The fiber according to claim 5, wherein the core region is further doped with chlorine, and further wherein the concentration of chlorine is highest at the center of the core region and varies inversely to the concentration of the fluorine as a function of the radius of the core region.

11. The fiber according to claim 5, wherein the cladding is further doped with at least one of the group consisting of boron trioxide and chlorine.

12. The fiber according to claim 6, wherein the center core region has a relative refractive index of −0.2% to +0.1% compared to pure silica.

13. An optical fiber, comprising:
a core region in the fiber that comprises fluorine-doped silica;
an inner cladding in the fiber that surrounds the core region and comprises silica doped with fluorine at a concentration greater than the concentration of the fluorine in the core region; and
an outer cladding in the fiber that surrounds the inner cladding and comprises silica with fluorine at a concentration approximately equal to or less than the minimum fluorine concentration of the fluorine in the core region,
wherein the core region has a graded refractive index profile with an alpha of about 0.5 to 5.

14. The fiber according to claim 13, wherein the core region comprises less than 1 wt. % $GeO_2$ and $TiO_2$, alone or in combination.

15. The fiber according to claim 13, wherein the fiber has an optical transmission property derived at least in part from fiber processing at a draw tension of approximately 45 g or less.

16. The fiber according to claim 13, wherein the outer cladding further comprises silicon oxynitride.

17. The fiber according to claim 13, wherein the outer cladding comprises silicon oxynitride having a nitrogen concentration of approximately 0.1 to 0.3 weight percent of the outer cladding.

18. The fiber according to claim 13, wherein the fiber comprises a 22 meter cutoff wavelength less than 1530 nm.

19. The fiber according to claim 13, wherein the fiber comprises an effective area at 1550 nm of less than or equal to 100 $microns^2$.

20. The fiber according to claim 1, further comprising:
a second cladding region that surrounds the first cladding region and comprises silica doped with fluorine, and further wherein the depressed region has a relative refractive index that is lower than a relative refractive index of the second cladding region.

21. The fiber according to claim 5, wherein the radius of the core region is approximately 10 to 50 microns, and an effective area of the core region ranges from approximately 90 $microns^2$ to 525 $microns^2$.

22. The fiber according to claim 13, wherein the inner cladding comprises a depressed region having a relative refractive index that is substantially constant and lower than a relative refractive index of the outer cladding region.

* * * * *